US012388905B2

(12) United States Patent
Landais et al.

(10) Patent No.: US 12,388,905 B2
(45) Date of Patent: Aug. 12, 2025

(54) APPARATUS, METHODS, AND COMPUTER PROGRAMS

(71) Applicant: NOKIA SOLUTIONS AND NETWORKS OY, Espoo (FI)

(72) Inventors: Bruno Landais, Pleumeur-Bodou (FR); Ioannis Mouroulis, Athens (GR)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 18/093,608

(22) Filed: Jan. 5, 2023

(65) Prior Publication Data

US 2023/0216929 A1 Jul. 6, 2023

(30) Foreign Application Priority Data

Jan. 6, 2022 (EP) .................................... 22150481

(51) Int. Cl.
*H04L 67/51* (2022.01)
(52) U.S. Cl.
CPC .................................... *H04L 67/51* (2022.05)
(58) Field of Classification Search
CPC ..................................................... H04L 67/51
USPC ......................................................... 709/223
See application file for complete search history.

(56) References Cited

U.S. PATENT DOCUMENTS

| | | | |
|---|---|---|---|
| 2020/0314615 A1* | 10/2020 | Patil | H04W 48/18 |
| 2021/0168055 A1 | 6/2021 | Lair et al. | |
| 2021/0250411 A1* | 8/2021 | Cakulev | H04L 67/52 |
| 2023/0261953 A1* | 8/2023 | Lu | H04L 67/56 |
| | | | 709/223 |

FOREIGN PATENT DOCUMENTS

WO WO-2020030291 A1 * 2/2020 ......... H04L 41/0813

OTHER PUBLICATIONS

3GPP TS 29.510 version 15.8.0 (130 pages) (Year: 2020).*
3GPP TS 29.510 V17.4.0 (Dec. 2021), Technical Specification, 3rd Generation Partnership Project; Technical Specification Group Core Network and Terminals; 5G System; Network Function Repository Services; Stage 3 (Release 17), Dec. 2021.
Extended European Search Report dated Jun. 21, 2022 corresponding to European Patent Application No. 22150481.4.
Ericsson, "Discussion on Essential Improvements on NF Discovery," 3GPP Draft; C4-215301, 3GPP TSG-CT WG4 Meeting #106-e, E-Meeting, Oct. 11-15, 2021, Oct. 1, 2021, XP052057660.

* cited by examiner

*Primary Examiner* — Wing F Chan
*Assistant Examiner* — Leon Y Tseng
(74) *Attorney, Agent, or Firm* — SQUIRE PATTON BOGGS (US) LLP

(57) ABSTRACT

There is provided a method, computer program, and apparatus for a network repository function that causes the network repository function to: alter, for a second network function, a value of an attribute in a network profile associated with said second network function; and signal, to a first network function, an identifier for said second network function in addition to an said altered value of said attribute, based on a first request for discovery from said first network function, wherein said network profile comprises an indication of a service and/or an attribute of said second network function.

18 Claims, 9 Drawing Sheets

APPARATUS, METHODS, AND COMPUTER PROGRAMS

CROSS REFERENCE TO RELATED APPLICATION

This application claims the benefit of European Patent Application No. 22150481.4, filed Jan. 6, 2022. The entire content of the above-referenced application is hereby incorporated by reference.

FIELD

Various examples described herein generally relate to apparatus, methods, and computer programs, and more particularly (but not exclusively) to apparatus, methods and computer programs for network apparatuses.

BACKGROUND

In general, a communication system can be seen as a facility that enables communication sessions between two or more entities such as user terminals, access nodes and/or other nodes by providing carriers between the various entities involved in the communications path. A communication system can be provided, for example, by means of a communication network and one or more compatible communication devices. The communication sessions may comprise, for example, communication of data for carrying communications such as voice, electronic mail (email), text message, multimedia and/or content data and so on. Content may be multicast or uni-cast to communication devices.

A user can access the communication system by means of an appropriate communication device or terminal. A communication device of a user is often referred to as user equipment (UE) or user device. The communication device may access a carrier provided by an access node and transmit and/or receive communications on the carrier.

The communication system and associated devices typically operate in accordance with a required standard or specification which sets out what the various entities associated with the system are permitted to do and how that should be achieved. Communication protocols and/or parameters which shall be used for the connection are also typically defined. One example of a communications system is UTRAN (3G radio). Another example of an architecture is the long-term evolution (LTE) or the Universal Mobile Telecommunications System (UMTS) radio-access technology. Another example communication system is so called 5G system that allows user equipment (UE) or user device to contact a 5G core via e.g. new radio (NR) access technology or via other access technology such as Untrusted access to 5GC or wireline access technology.

There is a need to provide control systems which enable a communications service provider (CSP) to control and optimise a complex network of communications system elements.

One of current approaches being employed is closed-loop automation and machine learning which can be built into self-organizing networks (SON) enabling an operator to automatically optimize every cell in the radio access network.

SUMMARY

According to a first aspect, there is provided an apparatus for a network repository function, the apparatus comprising means for: maintaining respective network profiles for a plurality of network functions, the network profiles each comprising indications of services and/or attributes of the network function associated with that network profile; receiving, from a first network function, a first request for a discovery of at least one second network function having an associated network profile that fulfils a set of search criteria; using the set of search criteria and the respective network profiles to determine the at least one second network function; altering, for at least one of the at least one second network function, a value of at least one attribute comprised in at least one of the network profiles associated with that second network function; and signalling, to the first network function in response to the first request, identifiers for the at least one second network function, and said altered value(s) of the at least one attribute.

According to a second aspect, there is provided an apparatus for a network repository function, the apparatus comprising means for: altering, for a second network function, a value of an attribute in a network profile associated with said second network function; and signalling, to a first network function, an identifier for said second network function in addition to said altered value of said attribute, based on a first request for discovery from said first network function, wherein said network profile comprises an indication of a service and/or an attribute of said second network function.

The first and second aspects may comprising the following further features.

The means for altering the value may comprise means for altering a priority value of selecting the at least one of the at least one second network function.

The priority value may correspond to a value representing a priority of: a network function instance of the at least one second network function; and/or a network function service instance of the at least one second network function; and/or a network function-type specific information priority of the at least one second network function.

The means for altering the priority may comprise means for: using the set of search criteria to rank the at least one second network function from those second network functions that most match the set of search criteria to those that least match the set of search criteria; and altering the priority for the at least one second network function to reflect the rank.

The means for signalling, to the first network function, identifiers for the at least one second network function and said altered values may comprise means for: providing, in said signalling to the first network function in respect of each of the at least one second network function, values for said at least one attribute regardless of whether the values have been altered by the apparatus.

The apparatus may comprise means for: receiving, from the first network function, a second request for discovering a network profile corresponding to at least one of the at least one second network function; and signalling the corresponding network profile to the first network apparatus in response to the second request.

The response to the first request may be signalled as part of an enhanced network function discovery procedure of the network repository function's network function discovery service.

The first network function may be: a user plane function, and/or an access and mobility management function, and/or a session management function, and/or a unified data management function, and/or a policy control function, and/or a network exposure function, and/or a network data and analytics function, and/or an application function, and/or a charging function.

The at least one second network function may be: a user plane function, and/or an access and mobility management function, and/or a session management function, and/or a unified data management function, and/or a policy control function, and/or a network exposure function, and/or a network data and analytics function, and/or an application function, and/or a charging function.

According to a third aspect, there is provided an apparatus for a first network function, the apparatus comprising means for: signalling, to a network repository function, a first request for a discovery of at least one second network function having an associated network profile that fulfils a set of search criteria, a network profile comprising indications of services and/or attributes of the network function associated with that network profile; receiving, from the network repository function in response to the first request, identifiers for the at least one second network function and, for at least one of the at least one second network function, at least one altered value altered by the network repository function for at least one attribute in a network profile associated with the at least one of the at least one second network function; using the at least one altered value to select at least one of the at least one second network functions for providing a service to the first network function; and signalling the selected at least one of the at least one second network function to request that a service be provided to the first network function.

The means for receiving, from the network repository function, identifiers for the at least one second network function and said at least one altered value may comprise means for: receiving, in said signalling in respect of each of the at least one second network function, values for said at least one attribute regardless of whether the values have been altered by the apparatus.

The apparatus may comprise means for signalling, to the first network apparatus, a second request for discovering a network profile corresponding to at least one of the at least one second network function; and receiving, from the network repository function the corresponding network profile of the at least one of the at least one second network function in response to the second request.

The means for using the at least one altered value to select at least one of the at least one second network functions for providing a service to the first network function may comprise means for selecting the at least one of the at least one second network functions using both the at least one altered value and the received corresponding network profile.

The apparatus may comprise means for receiving the requested service from the selected at least one of the at least one second network function.

The at least one attribute may correspond to a priority for selecting that second network function.

The priority may comprise comprises a priority value that corresponds to a value representing a priority of: a network function instance of the at least one second network function; a network function service instance of the at least one second network function; and/or a network function-type specific information priority of the at least one second network function.

The response to the first request may be signalled as part of an enhanced network function discovery procedure of the network repository function's network function discovery service.

The first network function may be: a user plane function, and/or an access and mobility management function, and/or a session management function, a unified data management function, and/or a policy control function, and/or a network exposure function, and/or a network data and analytics function, and/or an application function, and/or a charging function.

The at least one second network function may be: a user plane function, and/or an access and mobility management function, and/or a session management function, and/or a unified data management function, and/or a policy control function, and/or a network exposure function, and/or a network data and analytics function, and/or an application function, and/or a charging function.

According to a fourth aspect, there is provided an apparatus for a network repository function, the apparatus comprising: at least one processor; and at least one memory comprising code that, when executed by the at least one processor, causes the apparatus to: maintain respective network profiles for a plurality of network functions, the network profiles each comprising indications of services and/or attributes of the network function associated with that network profile; receive, from a first network function, a first request for a discovery of at least one second network function having an associated network profile that fulfils a set of search criteria; use the set of search criteria and the respective network profiles to determine the at least one second network function; alter, for at least one of the at least one second network function, a value of at least one attribute comprised in at least one of the network profiles associated with that second network function; and signal, to the first network function in response to the first request, identifiers for the at least one second network function, and said altered value(s) of the at least one attribute.

According to a fifth aspect, there is provided an apparatus for a network repository function, the apparatus comprising: at least one processor; and at least one memory comprising code that, when executed by the at least one processor, causes the apparatus to: alter, for a second network function, a value of an attribute in a network profile associated with said second network function; and signal, to a first network function, an identifier for said second network function in addition to an said altered value of said attribute, based on a first request for discovery from said first network function, wherein said network profile comprises an indication of a service and/or an attribute of said second network function.

The fourth and fifth aspects may comprising the following further features.

The altering the value may comprise m altering a priority value of selecting the at least one of the at least one second network function.

The priority value may correspond to a value representing a priority of: a network function instance of the at least one second network function; and/or a network function service instance of the at least one second network function; and/or a network function-type specific information priority of the at least one second network function.

The altering the priority may comprise: using the set of search criteria to rank the at least one second network function from those second network functions that most match the set of search criteria to those that least match the set of search criteria; and altering the priority for the at least one second network function to reflect the rank.

The signalling, to the first network function, identifiers for the at least one second network function and said altered values may comprise: providing, in said signalling to the first network function in respect of each of the at least one second network function, values for said at least one attribute regardless of whether the values have been altered by the apparatus.

The apparatus may be caused to: receive, from the first network function, a second request for discovering a network profile corresponding to at least one of the at least one second network function; and signal the corresponding network profile to the first network apparatus in response to the second request.

The response to the first request may be signalled as part of an enhanced network function discovery procedure of the network repository function's network function discovery service.

The first network function may be: a user plane function, and/or an access and mobility management function, and/or a session management function, and/or a unified data management function, and/or a policy control function, and/or a network exposure function, and/or a network data and analytics function, and/or an application function, and/or a charging function.

The at least one second network function may be: a user plane function, and/or an access and mobility management function, and/or a session management function, and/or a unified data management function, and/or a policy control function, and/or a network exposure function, and/or a network data and analytics function, and/or an application function, and/or a charging function.

According to a sixth aspect, there is provided an apparatus for a first network function, the apparatus comprising: at least one processor; and at least one memory comprising code that, when executed by the at least one processor, causes the apparatus to: signal, to a network repository function, a first request for a discovery of at least one second network function having an associated network profile that fulfils a set of search criteria, a network profile comprising indications of services and/or attributes of the network function associated with that network profile; receive, from the network repository function in response to the first request, identifiers for the at least one second network function and, for at least one of the at least one second network function, at least one altered value altered by the network repository function for at least one attribute in a network profile associated with the at least one of the at least one second network function; use the at least one altered value to select at least one of the at least one second network functions for providing a service to the first network function; and signal the selected at least one of the at least one second network function to request that a service be provided to the first network function.

The receiving, from the network repository function, identifiers for the at least one second network function and said at least one altered value may comprise: receiving, in said signalling in respect of each of the at least one second network function, values for said at least one attribute regardless of whether the values have been altered by the apparatus.

The apparatus may be caused to: signalling, to the first network apparatus, a second request for discovering a network profile corresponding to at least one of the at least one second network function; and receive, from the network repository function the corresponding network profile of the at least one of the at least one second network function in response to the second request.

The using the at least one altered value to select at least one of the at least one second network functions for providing a service to the first network function may comprise selecting the at least one of the at least one second network functions using both the at least one altered value and the received corresponding network profile.

The apparatus may be caused to: receive the requested service from the selected at least one of the at least one second network function.

The at least one attribute may correspond to a priority for selecting that second network function.

The priority may comprise comprises a priority value that corresponds to a value representing a priority of: a network function instance of the at least one second network function; and/or a network function service instance of the at least one second network function; and/or a network function-type specific information priority of the at least one second network function.

The response to the first request may be signalled as part of an enhanced network function discovery procedure of the network repository function's network function discovery service.

The first network function may be: a user plane function, and/or an access and mobility management function, and/or a session management function, and/or a unified data management function, and/or a policy control function, and/or a network exposure function, and/or a network data and analytics function, and/or an application function, and/or a charging function.

The at least one second network function may be at least one of: a user plane function, and/or an access and mobility management function, and/or a session management function, and/or a unified data management function, and/or a policy control function, and/or a network exposure function, and/or a network data and analytics function, and/or an application function, and/or a charging function.

According to a seventh aspect, there is provided a method for an apparatus for a network repository function, the method comprising: maintaining respective network profiles for a plurality of network functions, the network profiles each comprising indications of services and/or attributes of the network function associated with that network profile; receiving, from a first network function, a first request for a discovery of at least one second network function having an associated network profile that fulfils a set of search criteria; using the set of search criteria and the respective network profiles to determine the at least one second network function; altering, for at least one of the at least one second network function, a value of at least one attribute comprised in at least one of the network profiles associated with that second network function; and signalling, to the first network function in response to the first request, identifiers for the at least one second network function, and said altered value(s) of the at least one attribute.

According to an eighth aspect, there is provided a method for an apparatus for a network repository function, the method comprising: altering, for a second network function, a value of an attribute in a network profile associated with said second network function; and signalling, to a first network function, an identifier for said second network function in addition to said altered value of said attribute, based on a first request for discovery from said first network function, wherein said network profile comprises an indication of a service and/or an attribute of said second network function.

The seventh and eighth aspects may comprising the following further features.

The altering the value may comprise altering a priority value of selecting the at least one of the at least one second network function.

The priority value may correspond to a value representing a priority of: a network function instance of the at least one second network function; and/or a network function service instance of the at least one second network function; and/or a network function-type specific information priority of the at least one second network function.

The altering the priority may comprise: using the set of search criteria to rank the at least one second network function from those second network functions that most match the set of search criteria to those that least match the set of search criteria; and altering the priority for the at least one second network function to reflect the rank.

The signalling, to the first network function, identifiers for the at least one second network function and said altered values may comprise: providing, in said signalling to the first network function in respect of each of the at least one second network function, values for said at least one attribute regardless of whether the values have been altered by the apparatus.

The method may comprise: receiving, from the first network function, a second request for discovering a network profile corresponding to at least one of the at least one second network function; and signalling the corresponding network profile to the first network apparatus in response to the second request.

The response to the first request may be signalled as part of an enhanced network function discovery procedure of the network repository function's network function discovery service.

The first network function may be: a user plane function, and/or an access and mobility management function, and/or a session management function, and/or a unified data management function, and/or a policy control function, and/or a network exposure function, and/or a network data and analytics function, and/or an application function, and/or a charging function.

The at least one second network function may be: a user plane function, and/or an access and mobility management function, and/or a session management function, a and/or unified data management function, and/or a policy control function, and/or a network exposure function, and/or a network data and analytics function, and/or an application function, and/or a charging function.

According to a ninth aspect, there is provided a method for an apparatus for a first network function, the method comprising: signalling, to a network repository function, a first request for a discovery of at least one second network function having an associated network profile that fulfils a set of search criteria, a network profile comprising indications of services and/or attributes of the network function associated with that network profile; receiving, from the network repository function in response to the first request, identifiers for the at least one second network function and, for at least one of the at least one second network function, at least one altered value altered by the network repository function for at least one attribute in a network profile associated with the at least one of the at least one second network function; using the at least one altered value to select at least one of the at least one second network functions for providing a service to the first network function; and signalling the selected at least one of the at least one second network function to request that a service be provided to the first network function.

The receiving, from the network repository function, identifiers for the at least one second network function and said at least one altered value may comprise: receiving, in said signalling in respect of each of the at least one second network function, values for said at least one attribute regardless of whether the values have been altered by the apparatus.

The method may comprise: signalling, to the first network apparatus, a second request for discovering a network profile corresponding to at least one of the at least one second network function; and receiving, from the network repository function the corresponding network profile of the at least one of the at least one second network function in response to the second request.

The using the at least one altered value to select at least one of the at least one second network functions for providing a service to the first network function may comprise selecting the at least one of the at least one second network functions using both the at least one altered value and the received corresponding network profile.

The method may comprise receiving the requested service from the selected at least one of the at least one second network function.

The at least one attribute may correspond to a priority for selecting that second network function.

The priority may comprise comprises a priority value that corresponds to a value representing a priority of: a network function instance of the at least one second network function; and/or a network function service instance of the at least one second network function; and/or a network function-type specific information priority of the at least one second network function.

The response to the first request may be signalled as part of an enhanced network function discovery procedure of the network repository function's network function discovery service.

The first network function may be: a user plane function, and/or an access and mobility management function, and/or a session management function, and/or a unified data management function, and/or a policy control function, and/or a network exposure function, and/or a network data and analytics function, and/or an application function, and/or a charging function.

The at least one second network function may be: and/or a user plane function, and/or an access and mobility management function, and/or a session management function, and/or a unified data management function, and/or a policy control function, and/or a network exposure function, and/or a network data and analytics function, and/or an application function, and/or a charging function.

According to a tenth aspect, there is provided an apparatus for a network repository function, the apparatus comprising: maintaining circuitry for maintaining respective network profiles for a plurality of network functions, the network profiles each comprising indications of services and/or attributes of the network function associated with that network profile; receiving circuitry for receiving, from a first network function, a first request for a discovery of at least one second network function having an associated network profile that fulfils a set of search criteria; using circuitry for using the set of search criteria and the respective network profiles to determine the at least one second network function; altering circuitry for altering, for at least one of the at least one second network function, a value of at least one attribute comprised in at least one of the network profiles associated with that second network function; and signalling circuitry for signalling, to the first network function in response to the first request, identifiers for the at least one second network function, and said altered value(s) of the at least one attribute.

According to an eleventh aspect, there is provided an apparatus for a network repository function, the apparatus comprising: altering circuitry for altering, for a second network function, a value of an attribute in a network profile associated with said second network function; and signalling circuitry for signalling, to a first network function, an identifier for said second network function in addition to said altered value of said attribute, based on a first request for discovery from said first network function, wherein said network profile comprises an indication of a service and/or an attribute of said second network function.

The tenth and eleventh aspects may comprising the following further features.

The altering circuitry for altering the value may comprise altering circuitry for altering a priority value of selecting the at least one of the at least one second network function.

The priority value may correspond to a value representing a priority of: a network function instance of the at least one second network function; and/or a network function service instance of the at least one second network function; and/or a network function-type specific information priority of the at least one second network function.

The altering circuitry for altering the priority may comprise: using circuitry for using the set of search criteria to rank the at least one second network function from those second network functions that most match the set of search criteria to those that least match the set of search criteria; and altering circuitry for altering the priority for the at least one second network function to reflect the rank.

The signalling circuitry for signalling, to the first network function, identifiers for the at least one second network function and said altered values may comprise: providing circuitry for providing, in said signalling to the first network function in respect of each of the at least one second network function, values for said at least one attribute regardless of whether the values have been altered by the apparatus.

The apparatus may comprise: receiving circuitry for receiving, from the first network function, a second request for discovering a network profile corresponding to at least one of the at least one second network function; and signalling circuitry for signalling the corresponding network profile to the first network apparatus in response to the second request.

The response to the first request may be signalled as part of an enhanced network function discovery procedure of the network repository function's network function discovery service.

The first network function may be of: a user plane function, and/or an access and mobility management function, and/or a session management function, and/or a unified data management function, and/or a policy control function, and/or a network exposure function, and/or a network data and analytics function, and/or an application function, and/or a charging function.

The at least one second network function may be: a user plane function, and/or an access and mobility management function, and/or a session management function, and/or a unified data management function, and/or a policy control function, and/or a network exposure function, and/or a network data and analytics function, and/or an application function, and/or a charging function.

According to a twelfth aspect, there is provided an apparatus for a first network function, the apparatus comprising: signalling circuitry for signalling, to a network repository function, a first request for a discovery of at least one second network function having an associated network profile that fulfils a set of search criteria, a network profile comprising indications of services and/or attributes of the network function associated with that network profile; receiving circuitry for receiving, from the network repository function in response to the first request, identifiers for the at least one second network function and, for at least one of the at least one second network function, at least one altered value altered by the network repository function for at least one attribute in a network profile associated with the at least one of the at least one second network function; using circuitry for using the at least one altered value to select at least one of the at least one second network functions for providing a service to the first network function; and signalling circuitry for signalling the selected at least one of the at least one second network function to request that a service be provided to the first network function.

The receiving circuitry for receiving, from the network repository function, identifiers for the at least one second network function and said at least one altered value may comprise: receiving circuitry for receiving, in said signalling in respect of each of the at least one second network function, values for said at least one attribute regardless of whether the values have been altered by the apparatus.

The apparatus may comprise: signalling circuitry for signalling, to the first network apparatus, a second request for discovering a network profile corresponding to at least one of the at least one second network function; and receiving circuitry for receiving, from the network repository function the corresponding network profile of the at least one of the at least one second network function in response to the second request.

The using circuitry for using the at least one altered value to select at least one of the at least one second network functions for providing a service to the first network function may comprise selecting circuitry for selecting the at least one of the at least one second network functions using both the at least one altered value and the received corresponding network profile.

The apparatus may comprise receiving circuitry for receiving the requested service from the selected at least one of the at least one second network function.

The at least one attribute may correspond to a priority for selecting that second network function.

The priority may comprise comprises a priority value that corresponds to a value representing a priority of: a network function instance of the at least one second network function; and/or a network function service instance of the at least one second network function; and/or a network function-type specific information priority of the at least one second network function.

The response to the first request may be signalled as part of an enhanced network function discovery procedure of the network repository function's network function discovery service.

The first network function may be: a user plane function, and/or an access and mobility management function, and/or a session management function, and/or a unified data management function, and/or a policy control function, and/or a network exposure function, and/or a network data and analytics function, and/or an application function, and/or a charging function.

The at least one second network function may be: a user plane function, and/or an access and mobility management function, and/or a session management function, and/or a unified data management function, and/or a policy control function, and/or a network exposure function, and/or a network data and analytics function, and/or an application function, and/or a charging function.

According to a thirteenth aspect, there is provided non-transitory computer readable medium comprising program instructions for causing an apparatus for a network repository function to perform at least the following: maintain respective network profiles for a plurality of network functions, the network profiles each comprising indications of services and/or attributes of the network function associated with that network profile; receive, from a first network function, a first request for a discovery of at least one second network function having an associated network profile that fulfils a set of search criteria; use the set of search criteria and the respective network profiles to determine the at least one second network function; alter, for at least one of the at least one second network function, a value of at least one attribute comprised in at least one of the network profiles associated with that second network function; and signal, to the first network function in response to the first request, identifiers for the at least one second network function, and said altered value(s) of the at least one attribute.

According to a fourteenth aspect, there is provided non-transitory computer readable medium comprising program instructions for causing an apparatus for a network repository function to perform at least the following: alter, for a second network function, a value of an attribute in a network profile associated with said second network function; and signal, to a first network function, an identifier for said second network function in addition to an said altered value of said attribute, based on a first request for discovery from said first network function, wherein said network profile comprises an indication of a service and/or an attribute of said second network function.

The fourth and fifth aspects may comprising the following further features.

The altering the value may comprise m altering a priority value of selecting the at least one of the at least one second network function.

The priority value may correspond to a value representing a priority of: a network function instance of the at least one second network function; and/or a network function service instance of the at least one second network function; and/or a network function-type specific information priority of the at least one second network function.

The altering the priority may comprise: using the set of search criteria to rank the at least one second network function from those second network functions that most match the set of search criteria to those that least match the set of search criteria; and altering the priority for the at least one second network function to reflect the rank.

The signalling, to the first network function, identifiers for the at least one second network function and said altered values may comprise: providing, in said signalling to the first network function in respect of each of the at least one second network function, values for said at least one attribute regardless of whether the values have been altered by the apparatus.

The apparatus may be caused to: receive, from the first network function, a second request for discovering a network profile corresponding to at least one of the at least one second network function; and signal the corresponding network profile to the first network apparatus in response to the second request.

The response to the first request may be signalled as part of an enhanced network function discovery procedure of the network repository function's network function discovery service.

The first network function may be: a user plane function, and/or an access and mobility management function, and/or a session management function, and/or a unified data management function, and/or a policy control function, and/or a network exposure function, and/or a network data and analytics function, and/or an application function, and/or a charging function.

The at least one second network function may be: a user plane function, and/or an access and mobility management function, and/or a session management function, and/or a unified data management function, and/or a policy control function, and/or a network exposure function, and/or a network data and analytics function, and/or an application function, and/or a charging function.

According to a fifteenth aspect, there is provided non-transitory computer readable medium comprising program instructions for causing an apparatus for a first network function to perform at least the following: signal, to a network repository function, a first request for a discovery of at least one second network function having an associated network profile that fulfils a set of search criteria, a network profile comprising indications of services and/or attributes of the network function associated with that network profile; receive, from the network repository function in response to the first request, identifiers for the at least one second network function and, for at least one of the at least one second network function, at least one altered value altered by the network repository function for at least one attribute in a network profile associated with the at least one of the at least one second network function; use the at least one altered value to select at least one of the at least one second network functions for providing a service to the first network function; and signal the selected at least one of the at least one second network function to request that a service be provided to the first network function.

The receiving, from the network repository function, identifiers for the at least one second network function and said at least one altered value may comprise: receiving, in said signalling in respect of each of the at least one second network function, values for said at least one attribute regardless of whether the values have been altered by the apparatus.

The apparatus may be caused to: signal, to the first network apparatus, a second request for discovering a network profile corresponding to at least one of the at least one second network function; and receive, from the network repository function the corresponding network profile of the at least one of the at least one second network function in response to the second request.

The using the at least one altered value to select at least one of the at least one second network functions for providing a service to the first network function may comprise selecting the at least one of the at least one second network functions using both the at least one altered value and the received corresponding network profile.

The apparatus may be caused to: receive the requested service from the selected at least one of the at least one second network function.

The at least one attribute may correspond to a priority for selecting that second network function.

The priority may comprise comprises a priority value that corresponds to a value representing a priority of: a network function instance of the at least one second network function; and/or a network function service instance of the at least one second network function; and/or a network function-type specific information priority of the at least one second network function.

The response to the first request may be signalled as part of an enhanced network function discovery procedure of the network repository function's network function discovery service.

The first network function may be: a user plane function, and/or an access and mobility management function, and/or a session management function, and/or a unified data management function, and/or a policy control function, and/or a network exposure function, and/or a network data and analytics function, and/or an application function, and/or a charging function.

The at least one second network function may be: a user plane function, and/or an access and mobility management function, and/or a session management function, and/or a unified data management function, and/or a policy control function, and/or a network exposure function, and/or a network data and analytics function, and/or an application function, and/or a charging function.

According to a sixteenth aspect, there is provided a computer program product stored on a medium that may cause an apparatus to perform any method as described herein.

According to a seventeenth aspect, there is provided an electronic device that may comprise apparatus as described herein.

According to an eighteenth aspect, there is provided a chipset that may comprise an apparatus as described herein.

BRIEF DESCRIPTION OF FIGURES

Some examples, will now be described, merely by way of illustration only, with reference to the accompanying drawings in which.

DETAILED DESCRIPTION

In the following description of examples, certain aspects are explained with reference to mobile communication devices capable of communication via a wireless cellular system and mobile communication systems serving such mobile communication devices. For brevity and clarity, the following describes such aspects with reference to a 5G wireless communication system. However, it is understood that such aspects are not limited to 5G wireless communication systems, and may, for example, be applied to other wireless communication systems (for example, current 6G proposals).

Before describing in detail the examples, certain general principles of a 5G wireless communication system are briefly explained with reference to FIGS. 1A and 1B.

Figure 1A:
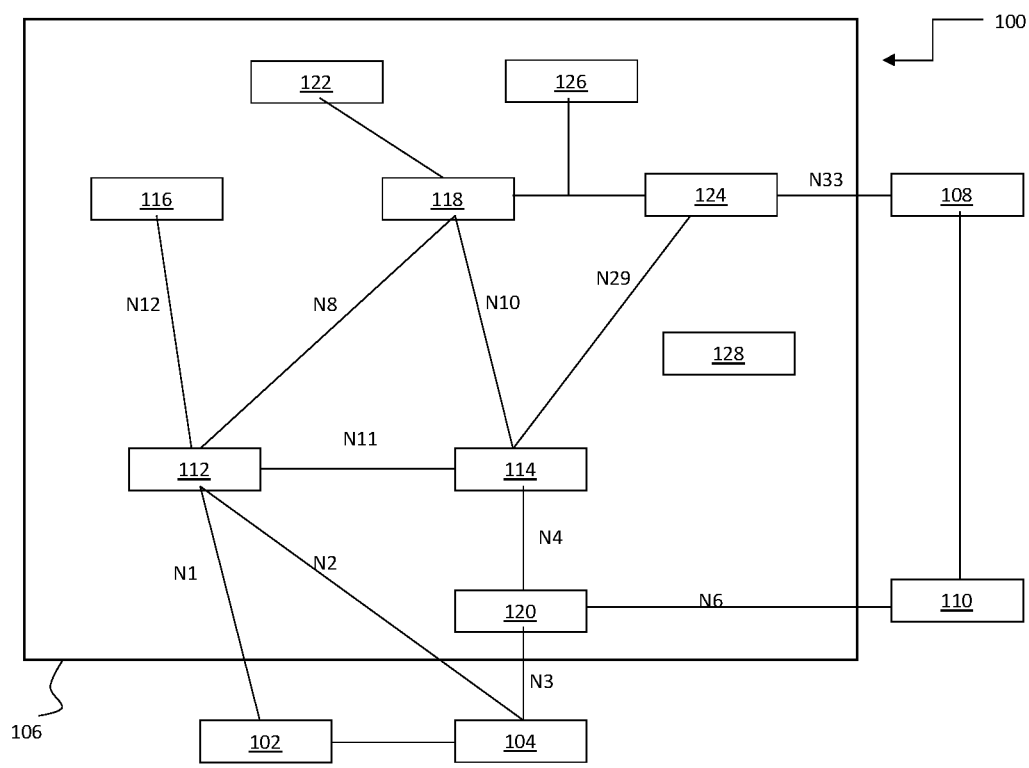
FIGS. 1A, 1B, and 1C show a schematic representation of a 5G system.

FIG. 1A shows a schematic representation of a 5G system (5GS) 100. The 5GS may comprise a user equipment (UE) 102 (which may also be referred to as a communication device or a terminal), a 5G access network (AN) (which may be a 5G Radio Access Network (RAN) or any other type of 5G AN such as a Non-3GPP Interworking Function (N3IWF)/a Trusted Non3GPP Gateway Function (TNGF) for Untrusted/Trusted Non-3GPP access or Wireline Access Gateway Function (W-AGF) for Wireline access) 104, a 5G core (5GC) 106, one or more application functions (AF) 108 and one or more data networks (DN) 110.

The 5G RAN may comprise one or more gNodeB (gNB) distributed unit functions connected to one or more gNodeB (gNB) unit functions. The RAN may comprise one or more access nodes.

The 5GC 106 may comprise one or more Access and Mobility Management Functions (AMF) 112, one or more Session Management Functions (SMF) 114, one or more authentication server functions (AUSF) 116, one or more unified data management (UDM) functions 118, one or more user plane functions (UPF) 120, one or more unified data repository (UDR) functions 122, one or more network repository functions (NRF) 128, and/or one or more network exposure functions (NEF) 124. The role of an NEF is to provide secure exposure of network services (e.g. voice, data connectivity, charging, subscriber data, and so forth) towards a 3rd party. Although NRF 128 is not depicted with its interfaces, it is understood that this is for clarity reasons and that NRF 128 may have a plurality of interfaces with other network functions.

The 5GC 106 also comprises a network data analytics function (NWDAF) 126. The NWDAF is responsible for providing network analytics information upon request from one or more network functions or apparatus within the network. Network functions can also subscribe to the NWDAF 126 to receive information therefrom. Accordingly, the NWDAF 126 is also configured to receive and store network information from one or more network functions or apparatus within the network. The data collection by the NWDAF 126 may be performed based on at least one subscription to the events provided by the at least one network function.

The network may further comprise a management data analytics service (MDAS) producer or MDAS Management Service (MnS) producer. The MDAS MnS producer may provide data analytics in the management plane considering parameters including, for example, load level and/or resource utilization. For example, the MDAS MnS producer fora network function (NF) may collect the NF's load-related performance data, e.g., resource usage status of the NF. The analysis of the collected data may provide forecast of resource usage information in a predefined future time window. This analysis may also recommend appropriate actions e.g., scaling of resources, admission control, load balancing of traffic, and so forth.

Figure 1B:
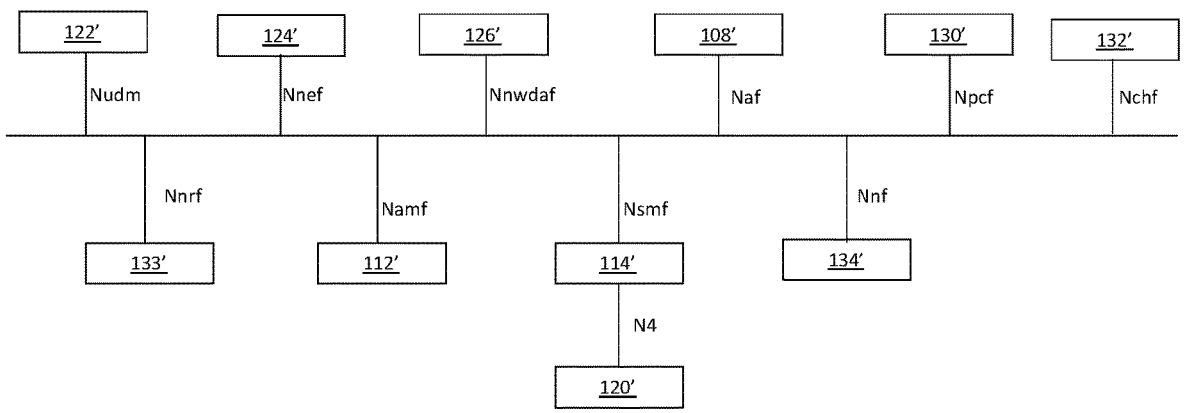
Figure 1C:
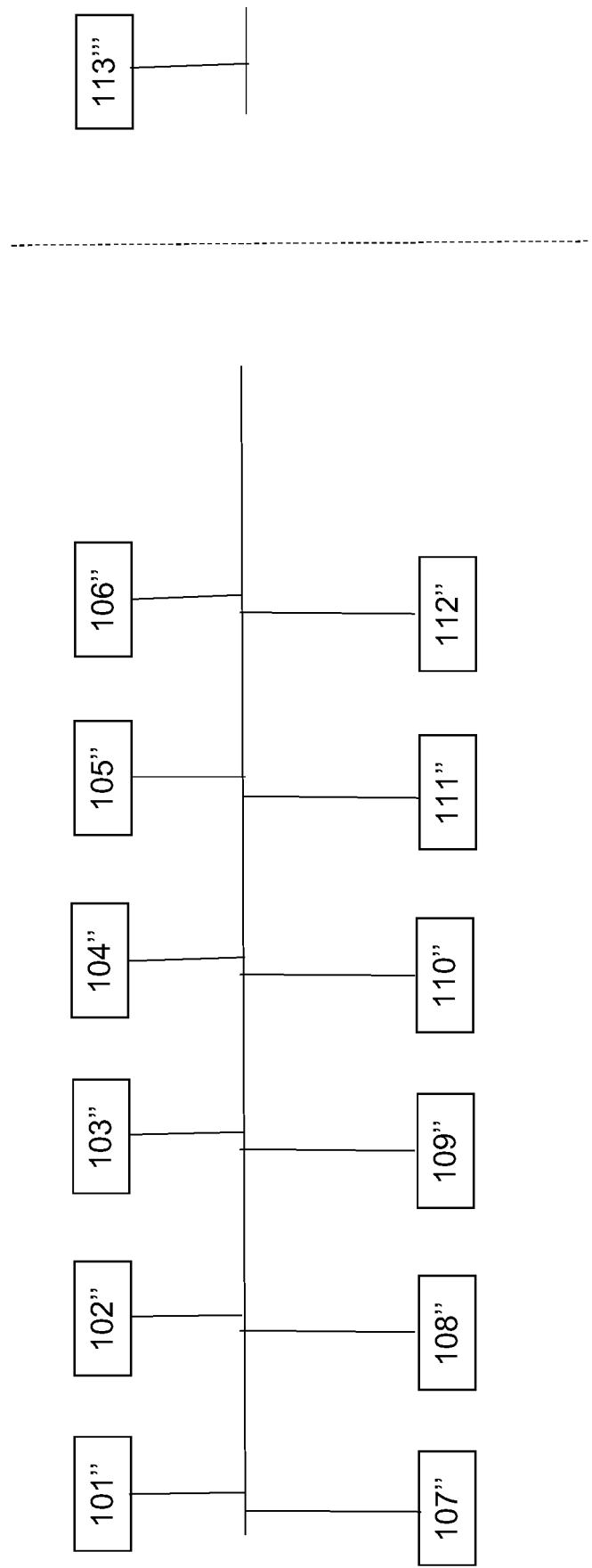

FIGS. 1B and 10 show a schematic representations of a 5GC represented in current 3GPP specifications. It is understood that this architecture is intended to illustrate potential components that may be comprised in a core network, and the presently described principles are not limited to core networks comprising only the described components.

FIG. 1B shows a 5GC 106' comprising a UPF 120' connected to an SMF 114' over an N4 interface. The SMF 114' is connected to each of a UDM 122', an NEF 124', an NWDAF 126', an AF 108', a Policy Control Function (PCF) 130', an AMF 112', and a Charging function 132' over an interconnect medium that also connects these network functions to each other. The 5G core 106' further comprises a network repository function (NRF) 133' and a network function 134' that connect to the interconnect medium.

FIG. 10 illustrates a 5G core network with reference to both a Home Public Land Mobile Network (HPLMN) and a Visited Public Land Mobile Network (VPLMN).

The HPLMN comprises architecture in a 5G core network at which a user equipment (not shown) is registered. The HPLMN comprises a Network Data Analytics Function (NWDAF) 101", a Gateway Mobile Location Centre (GMLC) 102", a network slice specific function (NSSF) 103", a network exposure function (NEF) 104", a network repository function (NRF) 105", a policy control function (PCF) 106", a unified data management (UDM) function 107", a location management function (LMF) 108", a unified data repository (UDR) 109", an access and mobility function (AMF) 110", an application function 111", and a charging function (CHF) 112".

The VPLMN may comprise analogous functions to those listed above in relation to the HPLMN. However, for clarity and brevity, the VPLMN is illustrated as comprising an NRF 113". This NRF 113" is configured to interface and/or interact with the NRF 705 of the HPLMN via an interface such as, for example, an N27 interface.

3GPP refers to a group of organizations that develop and release different standardized communication protocols. 3GPP develops and publishes documents pertaining to a system of "Releases" (e.g., Release 15, Release 16, and beyond).

3GPP has defined a Service Based Architecture (SBA) for the 5GC (5G Core network), with Network Function (NF) service producers exposing services to NF service consumers. NF service producers register a respective NF profile in a Network Repository Function (NRF). The NF profile for a particular NF service producer comprises NF-level specific information, including a list of NF service instances supported by the NF service producer with their associated attributes. An NF service consumer may be exposed to an NF service producer's services directly or indirectly. When the exposure is indirect, the exposure may be conducted through, for example, a service communication proxy (SCP).

NF Service consumers and/or SCPs may discover NF service producers by performing an NF Discovery procedure towards the NRF using query parameters in an NF discovery request that describe or otherwise characterizes the services and/or properties of the NF service producers they wish to discover. The NRF responds to the received discovery request by returning a response comprising NF profiles of candidate NF service producers matching the query parameters. An NF Discovery response may typically comprise NF profiles of multiple candidate producers.

Figure 6:
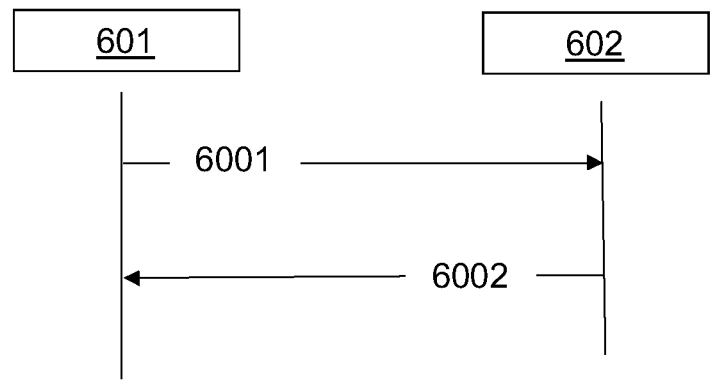
FIGS. 6 and 7 illustrate example signalling between apparatuses described herein.

This NF discovery procedure is illustrated with respect to FIG. 6.

FIG. 6 is a signalling diagram that illustrates signalling that may be performed between an NF service consumer 601 (which may be an SCP), and an NRF 602. The NF service consumer may also be labelled as a requester NF in the following.

At 6001, the NF service consumer 601 signals the NRF 602. This signal may be a Hypertext Transfer Protocol (HTTP) signal. This signal may comprise a GET message. This GET message may request an identification of at least one NF instance that fulfils a set of query parameters indicated in the GET message.

At 6002, the NRF 602 signals the NF service consumer 601.

When the NRF 602 has been able to successfully identify at least one NF instance that complies with the query parameters indicated in the signalling of 6001, this signalling of 6002 may comprise at least one identification of the at least one NF instance. This at least one identification may be comprised in a 200 OK message when the signaling of 6002 is HTTP signalling.

When the NRF 602 has not been able to successfully identify at least one NF instance that complies with the query parameters indicated in the signalling of 6001, this signalling of 6002 may indicate that no NF instance has been identified. The signalling in this case may further comprise an indication as to why the NRF has been unable to identify at least one NF instance. When the signalling of 6002 comprises HTTP signalling, this signalling may be, for example, a 200 OK response with an empty payload (e.g., when the request was successfully processed but no candidate NF service producer was found to match the request), or an "4xx/5xx" or a "3xx" message.

This signalling of FIG. 6 may be enhanced using an enhanced NF Discovery procedure specified from 3GPP Release 17 onwards in 3GPP TS 29.510. This enhanced NF Discovery procedure enables the NRF to return identifiers (IDs) of NF instances (e.g. in a nfInstanceList information element (IE)) comprising NF instance IDs pointing to the NF profiles of the candidate NF profiles in NF Discovery responses instead of returning the candidate NF profiles themselves within the response. For each such NF Instance ID comprised in the response, the response may further comprise information indicating which preference query parameters are matched or not. Preference query parameters may be considered to be parameters that indicate a preference that is comprised in the NF discovery request. The preference may be represented by search criteria. The preference query parameters indicate features and/or characteristics that are preferably, although not necessarily, matched by candidate NF instances. These preferences may relate to characteristics such as, for example, a preferred locality of the target NF, a preferred Tracking Area ID (TAI), and/or a preferred application programming interface (API) version to be supported by the candidate NF instance). For example, the response may comprise information indicating which of a preferred API version, preferred TAI, preferred features, and so forth, are matched to the preference(s) comprised in the request. This enhanced NF Discovery procedure is labelled as the "Enh-NF-Discovery" feature in the following. In the NF Discovery request, the requester NF may indicate whether the requester NF supports this feature. The requester NF may be considered as supporting this feature when the requester NF is able to successfully receive an nfInstanceList information element in the NF Discovery response.

In this enhanced NF discovery procedure, during 6001, the NF service consumer signals the NRF. The signalling may be as described above in relation to 6001, and be sent to a resource Uniform Resource Identifier (URI) labelled "nf-instances" collection resource.

Further, during the response of 6002, when a positive/success message is received, the response message of 6002 may comprise:

A validity period that indicates how long the information comprised in and/or otherwise associated with the response message will be valid. In other words, the validity period indicates a time for which the NF service consumer may cache the information comprised in the signalling of 6002.

At least one of:
   An array of NF profile objects that satisfy the search filter criteria comprised in the request of 6001
   A map of objects of NF instances (labelled as NFInstanceInfo in the enhanced NF discovery procedure) that satisfy the search filter criteria comprised in the request of 6001. This map may be provided when the NF service consumer indicated support of the enhanced NF discovery procedure in the initial request of 6001.

This is illustrated in Table 1, below, which illustrates potential information elements.

TABLE 1

Example information elements present in a success message of 6002 in the Enhanced Disovery procedure

| Attribute name | Data type | Cardinality | Description |
|---|---|---|---|
| validityPeriod | integer | 1 | This information element comprises a time in seconds during which the discovery result is considered valid and can be cached by the NF Service Consumer. This value may be the same as the value contained in the "max-age" parameter of the" Cache-Control" header field sent in the HyperText Transfer Protocol (HTTP) response. |
| nfInstances | array(NFProfile) | 0 . . . N | This information element comprises an array of NF Instance profiles, matching the search criteria indicated by the query parameters of the discovery request. When the nfInstancesList IE is absent, an empty array means there is no NF instance that can match the search criteria. |
| searchId | string | 0 . . . 1 | This information element may be present when the NRF stores the result of the current service discovery response in a given Uniform Resource Locator (URL) (server-side caching), to make it available in the future to NF Service Consumers without having to compute the whole search process again. |
| numNfInstComplete | Uint32 | 0 . . . 1 | This information element may be present when the total number of NF Instances found by NRF, as the result of the service discovery process, is higher than the actual number of NF Instances included in the attribute nfInstances of the SearchResult object. This may happen due to the NF Service Consumer including in the discovery request parameters such as "limit" or "max-payload-size". |
| preferredSearch | PreferredSearch | 0 . . . 1 | This information element may be present to indicate whether all the returned NFProfiles match the preferred query parameters, if the |

TABLE 1-continued

Example information elements present in a success message of 6002 in the Enhanced Disovery procedure

| Attribute name | Data type | Cardinality | Description |
| --- | --- | --- | --- |
| | | | discovery request contain any of the query parameter defined in the Preferred Search data type. |
| nrfSupportedFeatures | SupportedFeatures | 0 . . . 1 | Features supported by the NRF for the NFDiscovery service. This information element maybe present if the NRF supports at least one feature. |
| nfInstanceList | map(NfInstanceInfo) | 1 . . . N | This information element may be present when the NF Discovery request indicated support of the Enh-NF-Disco very feature. When present, this information element may comprise a map of NfinstanceInfo of NF instance profiles matching the search criteria indicated by the query parameters of the discovery request. The key of the map shall be the NF instance ID. |

The array and/or map may comprise indications of, for example, all NF Instances offering a certain NF Service name registered at the NRF, or an empty array/map in the event that the search filter criteria does not match any NF Instance registered at the NRF.

When the response of 6002 comprises a map of NFInstanceInfo objects of NF instances, the NF Service Consumer may subsequently retrieve any NF profile associated with at least one of those NF instances by issuing a service discovery request with the target-nf-instance-id parameter identifying the target NF Instance ID to the NRF. The service discovery request may comprise a parameter (labelled as the "nrf-disc-uri") that is set to the application programming interface (API) uniform resource interface (URI) of the Nnrf_NFDiscovery service of the NRF holding the NF profile when the "nrfDiscApiUri" attribute was received in the NFInstanceInfo object and when the service discovery request is addressed to a different NRF than the NRF holding the NF profile.

An NF service producer (NFp) may register, in its NF profile, a priority attribute at various different levels. For example, an NFp may register a priority attribute at at least one of an NF instance level, an NF service instance level, and/or even possibly at an NF-type specific information level. This is illustrated below with reference to Tables 2 to 6 below, with the priority attribute being provided in bold and italics.

As will be seen in the following tables, different elements defined in subject specifications (e.g., NFprofile, which is a data entry that comprises an NF profile of a given NF Instance) may have certain priority values overwritten by an NRF when that NF profile is being provided to a requesting/discovering NFc. The NRF may overwrite the priority values registered by the NFp in the NF profiles it returns in NF Discovery responses. This overwriting may be performed, for example, based on the preference query parameters received in NF Discovery requests. This overwriting may be performed, for example, so as to reflect which candidate NF instances or NF service instances better match the NF Discovery request.

TABLE 2

Definition of type NFProfile

| Attribute name | Data type | Cardinality | Description |
| --- | --- | --- | --- |
| nfInstanceId | NfInstanceId | 1 | Unique identity of the NF Instance. |
| nfType | NFType | 1 | Type of Network Function |
| nfStatus | NFStatus | 1 | Status of the NF Instance |
| nfInstanceName | string | 0 . . . 1 | Human readable name of the NF Instance |
| . . . | . . . | . . . | . . . |
| priority | integer | 0 . . . 1 | Priority (relative to other NFs of the same type) within the range 0 to 65535, to be used for NF selection; lower values indicate a higher priority to be selected. Priority may or |

TABLE 2-continued

Definition of type NFProfile

| Attribute name | Data type | Cardinality | Description |
| --- | --- | --- | --- |
| | | | may not be present in the nfServiceList parameters, xxxInfo parameters and in this attribute. Priority in the nfServiceList has precedence over the priority in this attribute Priority in xxxInfo parameter may only be used to determine the relative priority among NF instances with the same priority at NFProfile/NFService. The NRF may overwrite the received priority value when exposing an NFProfile with the Nnrf_NFDiscovery service. |
| capacity | integer | 0 . . . 1 | Static capacity information within the range 0 to 65535, expressed as a weight relative to other NF instances of the same type; when capacity is also present in the nfServiceList parameters, those will have precedence over this value. |
| Load | integer | 0 . . . 1 | Dynamic load information, within the range 0 to 100, indicates the current load percentage of the NF. |
| . . . | . . . | . . . | . . . |
| smfInfo | SmfInfo | 0 . . . 1 | Specific data for the SMF (Data Network Names (DNNs), . . . ). |
| smfInfoList | map(SmfInfo) | 1 . . . N | Multiple entries of SmfInfo. This attribute may provide additional information to the smfInfo. smfInfoList may be present even if the smfInfo is absent. The key of the map is a (unique) valid JSON string per clause 7 of IETF RFC 8259, with a maximum of 32 characters. |
| upfInfo | UpfInfo | 0 . . . 1 | Specific data for the UPF (Single - Network Slice Selection Assistance Information (S-NSSAI), DNN, SMF serving area, interface . . . ) |
| upfInfoList | map(UpfInfo) | 1 . . . N | Multiple entries of UpfInfo. This attribute provides additional information to the upfInfo. upfInfoList may be present even if the upfInfo is absent. The key of the map may be a (unique) valid JSON string per clause 7 of IETF RFC 8259 [22], with a maximum of 32 characters. |

TABLE 3

Definition of type NFService

| Attribute name | Data type | Cardinality | Description |
| --- | --- | --- | --- |
| serviceInstanceId | String | 1 | Unique ID of the service instance within a given NF Instance |
| serviceName | ServiceName | 1 | Name of the service instance (e.g. "nudm-sdm") |
| versions | array(NFServiceVersion) | 1 . . . N | The API versions supported by the NF Service and if available, the corresponding retirement date of the NF Service. The different array elements may have distinct uniquevalues for "apiVersionInUri", and consequently, the values of "apiFullVersion" may have a unique first digit version number. |

TABLE 3-continued

Definition of type NFService

| Attribute name | Data type | Cardinality | Description |
|---|---|---|---|
| scheme | UriScheme | 1 | Uniform Resource Identifier (URI) scheme (e.g. "http", "https") |
| ... | ... | ... | ... |
| priority | Integer | 0 ... 1 | Priority (relative to other services of the same type) in the range of 0-65535, to be used for NF Service selection; lower values indicate a higher priority for selection. The NRF may overwrite the received priority value when exposing an NFProfile with the Nnrf_NFDiscovery service. |
| capacity | Integer | 0 ... 1 | Static capacity information in the range of 0-65535, expressed as a weight relative to other services of the same type. |
| load | Integer | 0 ... 1 | Dynamic load information, ranged from 0 to 100, indicates the current load percentage of the NF Service. |
| ... | ... | ... | ... |

TABLE 4

Definition of type SmfInfo

| Attribute name | Data type | Cardinality | Description |
|---|---|---|---|
| sNssaiSmfInfoList | array(SnssaiSmfInfoItem) | 1 ... N | List of parameters supported by the SMF per S-NSSAI |
| taiList | array(Tai) | 1 ... N | The list of Tracking Area Identifiers (TAIs) the SMF can serve. It may contain one or more non-3GPP access TAIs. The absence of this attribute and the taiRangeList attribute indicate that the SMF can be selected for any TAI in the serving network. |
| taiRangeList | array(TaiRange) | 1 ... N | The range of TAIs the SMF can serve. It may comprise non-3GPP access TAIs. The absence of this attribute and the taiList attribute indicate that the SMF can be selected for any TAI in the serving network. |
| ... | ... | ... | ... |
| priority | integer | 0 ... 1 | Priority (relative to other NFs of the same type) in the range of 0-65535, to be used for NF selection for a service request matching the attributes of the SmfInfo; lower values indicate a higher priority for selection. The NRF may overwrite the received priority value when exposing an NFProfile with the Nnrf_NFDiscovery service. Absence of this attribute equals to having the same smfInfo priority as the priority defined at NFProfile/NFService level. |
| ... | ... | ... | ... |

TABLE 5

Definition of type UpfInfo

| Attribute name | Data type | Cardinality | Description |
|---|---|---|---|
| sNssaiUpfInfoList | array(SnssaiUpfInfoItem) | 1 ... N | List of parameters supported by the UPF per S-NSSAI |
| smfServingArea | array(string) | 1 ... N | The SMF service area(s) the UPF can serve. |

TABLE 5-continued

Definition of type UpfInfo

| Attribute name | Data type | Cardinality | Description |
|---|---|---|---|
| | | | If not provided, the UPF can serve any SMF service area. |
| ... | ... | ... | ... |
| taiList | array(Tai) | 1 ... N | The list of TAIs the UPF can serve. It may contain one or more non-3GPP access TAIs. The absence of this attribute and the taiRangeList attribute indicates that the UPF can serve the whole SMF service area defined by the smfServingArea attribute. |
| taiRangeList | array(TaiRange) | 1 ... N | The range of TAIs the UPF can serve. It may contain non-3GPP access TAIs. The absence of this attribute and the taiList attribute indicates that the UPF can serve the whole SMF service area defined by the smfServingArea attribute. |
| ... | ... | ... | ... |
| priority | integer | 0 ... 1 | Priority (relative to other NFs of the same type) in the range of 0-65535, to be used for NF selection for a service request matching the attributes of the UpfInfo; lower values indicate a higher priority for selection. See the precedence rules in the description of the priority attribute in NFProfile, when Priority is also present in NFProfile. The NRF may overwrite the received priority value when exposing an NFProfile with the Nnrf_NFDiscovery service. |
| ... | ... | ... | ... |

TABLE 6

URI query parameters supported by the GET method on this resource

| Name | Data type | Cardinality | Description |
|---|---|---|---|
| target-nf-type | NFType | 1 | This Information Element (IE) comprises the NF type of the target NF being discovered. |
| ... | ... | ... | ... |
| preferred-locality | string | 0 ... 1 | Preferred target NF location (e.g. geographic location, data center). When present, the NRF may prefer NF profiles with a locality attribute that matches the preferred-locality. The NRF may return additional NFs in the response not matching the preferred target NF location, e.g. if no NF profile is found matching the preferred target NF location. The NRF may set a lower priority for any additional NFs on the response not matching the preferred target NF location than those matching the preferred target NF location. |
| preferred-tai | Tai | 0 ... 1 | When present, the NRF may prefer NF profiles that can serve the tracking area identifier (TAI), or the NRF shall return NF profiles not matching the TAI when no NF profile is found matching the TAI. |
| preferred-nf-instances | array(Nf-InstanceId) | 1 ... N | When present, this IE may comprise a list of preferred candidate NF instance IDs. |
| preferred-api-versions | map(string) | 1 ... N | When present, this Information element may indicate the preferred Application Programming Interface (API) version of the services that are supported by the target NF instances. The key of the map is the ServiceName, for which the preferred API version is indicated. Each element carries the API Version Indication for the service indicated by the key. The NRF may return additional NFs in the response not matching the preferred API versions, e.g. when |

TABLE 6-continued

URI query parameters supported by the GET method on this resource

| Name | Data type | Cardinality | Description |
|---|---|---|---|
| | | | no NF profile is found matching the preferred-api-versions.<br>An API Version Indication is a string formatted as {operator} + {API Version}.<br>The following operators may be supported:<br>"=" match a version equals to the version value indicated.<br>">" match any version greater than the version value indicated<br>">=" match any version greater than or equal to the version value indicated<br>"<" match any version less than the version value indicated<br>"<=" match any version less than or equal to the version value indicated<br>"^" match any version compatible with the version indicated, i.e. any version with the same major version as the version indicated.<br>Precedence between versions is identified by comparing the Major, Minor, and Patch version fields numerically, from left to right.<br>If no operator or an unknown operator is provided in API Version Indication, "=" operator is applied.<br>Example of API Version Indication:<br>Case1: "=1.2.4.operator-ext" or "1.2.4.operator-ext" means matching the service with API version "1.2.4.operator-ext"<br>Case2: ">1.2.4" means matching the service with API versions greater than "1.2.4"<br>Case3: "^2.3.0" or "^2" means matching the service with all API versions with major version "2" |
| preferred-full-plmn | boolean | 0 . . . 1 | When present, the NRF may prefer NF profile(s) that can serve the full PLMN (i.e. can serve any TAI in the PLMN), or the NRF may return other NF profiles if no NF profile serving the full PLMN is found:<br>For example, when the value for this entry is:<br>true: NF instance(s) serving the full Public Land Mobile Network (PLMN) is preferred;<br>false: NF instance(s) serving the full PLMN is not preferred. |
| preferred-vendor-specific-features | map(map (array(Vendor-Specific-Feature))) | 1 . . . N(1 . . . M(1 . . . L)) | When present, this Information element may indicate the list of preferred vendor-specific features supported by the target Network Function, as defined by the supportedVendorSpecificFeatures attribute in NFService. NF profiles that support all the preferred features, or by default, NF profiles that comprise an identifier of at least one service supporting the preferred features, may be preferentially returned in the response; NF profiles in the response may not support the preferred features.<br>A key of the external map is the ServiceName for which the preferred vendor-specific features is indicated. Each element carries the preferred vendor-specific features for the service indicated by the key.<br>The key of the internal map may be the Internet Assigned Numbers Authority (IANA)-assigned "SMI Network Management Private Enterprise Codes". The string used as key of the internal map may comprise 6 decimal digits; when the Structure of Management Information (SMI) Network Management Private Enterprise code has less than 6 digits, the SMI code may be padded with leading digits "0" to complete a 6-digit string value.<br>The value of each entry of the map may be a list (array) of VendorSpecificFeature objects. |

TABLE 6-continued

URI query parameters supported by the GET method on this resource

| Name | Data type | Cardinality | Description |
|---|---|---|---|
| preferred-vendor-specific-nf-features | map(array (Vendor-SpecificFeature)) | 1 ... N(1 ... M) | The NF profiles returned by the NRF may comprise the full list of vendor-specific-features and not just the interclause of supported and preferred vendor-specific features. When present, this Information element may indicate a list of preferred vendor-specific features supported by the target Network Function, as defined by the supportedVendorSpecificFeatures attribute in the NF profile. NF profiles that support all the preferred features should be preferentially returned in the response. NF profiles in the response may not support the preferred features. The key of the map is the IANA-assigned "SMI Network Management Private Enterprise Codes". The value of each entry of the map may be a list (array) of VendorSpecificFeature objects. The NF profiles returned by the NRF shall include the full list of vendor-specific features and not just the interclause of supported and preferred vendor-specific features. |

Other query parameters comprised in a discover request may also cause the NRF to determine different priorities for different candidate NF profiles. For example, query parameters relating to any of client-type, vsmf-support-ind, and/or mbs-session-id-list parameters may affect a priority determined by the NRF.

The NF service consumer may also indicate the relative precedence of the preference query parameters in the NF Discovery request.

It has recently been agreed that the NRF may indicate in the NF Discovery response whether the NRF has altered the priority information in the NF profiles returned in the response. This indication may result in, when the NF consumer receives a different priority value in a subsequent NF Profile change notification for NF instance(s) returned in a search result, the NF consumer (NFc) does not overwrite the NRF altered priority in the cached search result. This lack of NF service consumer overwriting allows the NF service consumer to still use the NRF altered priorities returned in the NF Discovery response.

This is illustrated in the following example. An NF service consumer (NFc) may discover candidate NF service producers (NFp) by issuing an NF Discovery Request to the NRF. The NFc may then cache any NFp profiles returned by the NRF. The NRF may, at selected times (e.g. in response to trigger events), signal changes to the parameters of the NFp profiles by issuing NF status change notifications to the NFc when the NFc has subscribed to be notified about such changes.

Prior to the above agreement to change the 3GPP specification, an NFc would typically overwrite the priority information stored in the cached NFp profile when the NRF notifies the NFc of a change of the priority in the NFp profile. The above agreement clarifies that the NFc shall not overwrite the priority when the initial NF discovery response indicated that the NRF had altered the priority of the NFp profiles in the NF Discovery response.

The enhanced NF Discovery procedure specified from Release 17 onwards in TS 29.510 does not allow the NRF to return, to the requester NF service consumer (NFc) any altered priority values for the candidate NF instances and NF service instances. This is because the enhanced NF Discovery response is not enabled to signal any priority information. Enabling an NRF to alter priority values allows the NRF to indicate to an NFc which candidate NF profiles best match the parameters comprised in an NF Discovery Request received from the NFc. The NRF may be configured with operator policies affecting how the NRF sets the relative priorities of candidate NF profiles. The NFc may obtain profile information about the candidate NFps indicated by the NRF by signalling, to the NRF, NF Discovery Requests in respect of each candidate NFp to obtain NF profile information for those candidate NFps. The NFc may use the priorities sent in response to an NF Discovery Request to select an NFp among the candidate NFps indicated by the NRF Further, when the NFc subsequently issues an NF Discovery request to retrieve a NFp profile whose URI was returned in the enhanced NF Discovery response, the NRF does not receive the preference query parameters from the NFc that were used to determine the set of candidate NF instances in the first place. This means that the NRF cannot determine and alter the relative priority of the requested NFp instance and service instances.

One previous disclosure proposed that the NRF be configured to return a "rank" attribute per URI returned in the enhanced NF Discovery response. This "rank" attribute indicates how well the related NF profile matches the discovery request and may be used by the NFc/requesting NF to subsequently retrieve one or more NF profiles from the NRF based on this ranking and the other information comprised in the enhanced NF Discovery response. This previous proposal was not adopted as the NRF did not previously set this attribute and because the intended usage was only for enabling the NFc to determine which NF profiles it should preferably retrieve first. This rank attribute was not defined as the priority information of the NF profile, and does not correspond to the priority information of the NF instance, NF service instance and NF type specific data of the NF profile.

The following proposes further improvements to the enhanced NF Discovery procedure.

In particular, the following proposes at least one mechanism for enabling the NRF to signal, in an enhanced NF discovery response to an NFc, NRF altered priorities per candidate NF instance. The NRF altered priorities may correspond to the priorities of the NF instance, NF service instances and/or NF type specific priorities. Further, the NFc may be configured to apply the NRF altered priorities to NF profiles the NFc subsequent retrieves from the NRF when selecting the NF service producer.

The NRF may signal the NRF altered priority information in a number of different ways.

For example, the NRF may signal only the priority information modified by the NRF (i.e. the NRF needs not signal any priority information for NF instance, service instances of NF type specific data when (e.g., in the case that) the NRF has not altered the priority registered in the NF profile).

As another example, the NRF may signal the priority information corresponding to all levels for every candidate NF profile (for, for example, the NF instance, each NF service instance and NF type specific data).

More generically, the following proposes allowing the NRF to alter the value of any information in the NF profile (e.g. not only the priority information), and to provide that altered information in an enhanced NF Discovery response. Further, the NFc may be configured to apply the NRF altered information to NF profiles the NFc subsequent retrieves from the NRF when selecting the NF service producer.

This is illustrated with respect to the following examples.

Figure 7:
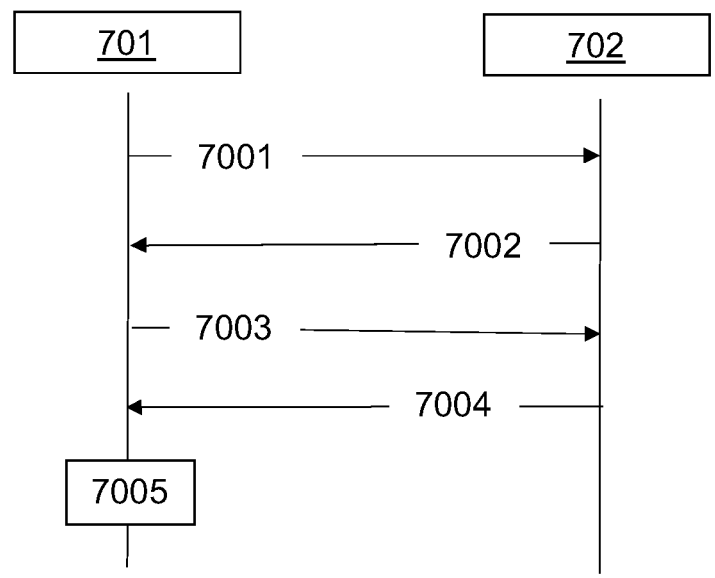

A first of these examples is illustrated with respect to FIG. 7.

FIG. 7 illustrates signalling that may be performed between an NFc 701 and an NRF 702. Both of these entities may be comprised in a same serving PLMN or they may be comprised in different PLMNs. For example, the NFc may be comprised in a visitor PLMN, and the NRF may be comprised in a home PLMN (or another Visitor PLMN), and vice versa.

During 7001, the NFc 701 signals the NRF 702. This signalling of 7001 may be a request for candidate NF profiles that fulfil a set of search query parameters. The search query parameters and/or values associated therewith may be comprised in the signalling of 7001. The signalling of 7001 may comprise a HTTP signalling message. For example, the signalling of 7001 may comprise a GET message.

During 7002, the NRF 702 responds to the signalling of 7001. This signalling of 7002 may comprise at least one identifier of candidate NF profiles that match the search query parameters and/or values associated therewith comprised in the signalling of 7001. The at least one identifier may comprise at least one NF Instance ID. The at least one identifier may additionally comprise an address (e.g., a URI) of the NF Discovery service of the NRF holding the NF profile. The signalling may comprise a new information element that indicates, for each of the indicated NF profiles identified by the at least one identifier, respective altered priorities. This new information element is labelled herein as "nrfAlteredPriorities". The NRF 702 may be configured to comprise the new information element in the signalling of 7002 when the NRF determines that the NRF is to indicate any altered priorities for the corresponding candidate NF profile (e.g., when the priority of the candidate NF instance, NF service instances and/or NF type specific data is modified for the corresponding NF Discovery Request). The NRF may determine that the NRF is to indicate at least one altered priority based on operator policies in NRF and/or based on reception of preference query parameters received from the NFc in the NF discovery request of 7001. The NRF 702 may be configured to comprise the new information element in the signalling of 7002 only when the NRF determines that the NRF wants to indicate any altered priorities for the corresponding candidate NF profile.

The signalling of 7002 may comprise a mix of NF profiles and at least one identifier of other candidate NF profiles. The new nrfAlteredPriorities information element may be configured to only comprise altered priority information for candidate NFs whose NF profile is not comprised in the NF Discovery Response.

Tables 7 and 8 illustrate attributes that may be comprised in the signalling of 7002, and attributes defining the "nrfAlteredPriorities". It is understood that not all of the below fields are provided in all responses of the NRF 702 to the signalling of 7001.

TABLE 7

Signalling of 7002 ("NfInstanceInfo")

| Attribute name | Data type | Cardinality | Description |
| --- | --- | --- | --- |
| nrfDiscApiUri | Uri | 0 ... 1 | This Information element may be present when the NRF holding the NF profile is not the NRF that received the NFDiscover request. It may be present otherwise. When present, this information element may comprise the API URI of the Nnrf_NFDiscovery service of the NRF holding the NF profile. The API URI may be formatted as specified in 3GPP standards. |
| preferredSearch | PreferredSearch | 0 ... 1 | This information element may be present to indicate whether the NF Profile matches the preferred query parameters when the discovery request comprises any of the query parameter defined in the PreferredSearch data type. This information element takes precedence over the preferredSearch IE in the SearchResult, if any. |

TABLE 7-continued

Signalling of 7002 ("NfInstanceInfo")

| Attribute name | Data type | Cardinality | Description |
| --- | --- | --- | --- |
| nrfAlteredPriorities | NrfAlteredPriorities | 0 . . . 1 | This information element may be present when the NRF wishes to signal modified priorities for the NF instance profile. |

TABLE 8

| NrfAlteredPriorities | | | |
| --- | --- | --- | --- |
| Attribute name | Data type | Cardinality | Description |
| nfProfilePriority | integer | 0 . . . 1 | This information element may be present when the NRF overwrites the Priority of a NF Instance on NFProfile level. This information element may comprise the Priority value as set by the NRF. The absence of this information element means that the Priority on an NF level (if any) is not overwritten. |
| nfServiceListPriority | map(integer) | 0 . . . N | This information element may be present when the NRF overwrites the Priority of a NF Instance on an NFService level. The value of each entry may be the Priority set by the NRF for the Service Instance indicated by the key. The Key is the serviceInstanceId for which the Priority is overwritten by the NRF. The absence of this information element (and/or when a serviceInstanceId is not included in the map) means that for the relevant Service Instance(s) the Priority (if any) is not overwritten. |
| smfInfoPriority | integer | 0 . . . 1 | This information element may be present when the NRF overwrites the Priority of a NF Instance within the smfInfo (i.e. the session management Information) stored in the NFProfile. The value is the Priority set by the NRF. The absence of this information element means that the smfInfo Priority (if any) is not overwritten. |
| upfInfoPriority | integer | 0 . . . 1 | This information element may be present when the NRF overwrites the Priority of a NF Instance within the upfInfo (i.e. the user plane function) stored in the NFProfile. The value is the Priority set by the NRF. The absence of this information element means that the upfInfo Priority (if any) is not overwritten. |
| smfInfoListPriority | map(integer) | 1 . . . N | This information element may be present when the NRF overwrites the Priority of a NF Instance within the smfInfoList. The value of each entry may be the Priority set by the NRF for the smfInfo indicated by the key. The Key is the key used to identify the smfInfo within the smfInfoList IE within the NFProfile. The absence of this information element (and/or when a smfInfo key is not included in the map) means that for the relevant smfInfo(s) the Priority (if any) is not overwritten. |
| upfInfoListPriority | map(integer) | 1 . . . N | This information element may be present when the NRF overwrites the Priority of a NF Instance within the upfInfo List. |

TABLE 8-continued

NrfAlteredPriorities

| Attribute name | Data type | Cardinality | Description |
| --- | --- | --- | --- |
| | | | The value of each entry may be the Priority set by the NRF for the upfInfo indicated by the key. The Key is the key used to identify the upfInfo within the upfInfoList IE within the NFProfile. The absence of this information element (and/or when a upfInfo key is not included in the map) means that for the relevant upfInfo(s) the Priority (if any) is not overwritten. |

The signalling of 7002 may comprise an HTTP message. The signalling of 7002 may comprise a "200 OK" message.

During 7003, the NFc 701 signals the NRF 702. This signalling of 7003 may comprise an NF Discovery request for retrieving the NF profile of a candidate NF whose identifier was received during 7002. This signalling of 7003 may comprise at least one of the identifier(s) received during 7002. This signalling of 7003 may comprise all of the identifier(s) received during 7002. This signalling of 7003 may comprise an HTTP message. This signalling of 7003 may comprise a "GET" message.

During 7004, the NRF 702 signals the NFc 701. This signalling of 7004 may be a response to the signalling of 7003. The signalling of 7004 may comprise at least one NF profile corresponding to the at least one identifier provided during 7003. This signalling of 7004 may comprise NF profiles respectively corresponding to all of the identifiers provided during 7003. The signalling of 7004 may comprise a HTTP message. The HTTP message may be a "200 OK" message.

In this example of FIG. 7, when the NRF does not modify the priority registered by the NFp in the NRF, the NF Discovery response for an enhanced NF Discovery does not comprise any priority information for that NFp. The NF service consumer then signals a subsequent NF Discovery request to the NRF to retrieve the profile of a candidate NF instance ID (i.e. that was listed in nfInstanceList in the first NF Discovery response), in which the NFc will find the priority that was registered by the NFp.

When 7003 and 7004 relate to a single NF and the signalling of 7002 comprises identifiers of multiple candidate NFs, 7003 and 7004 may be repeated in respect of each of the multiple candidate NFs (i.e., so that each of 7003 and 7004 occur in respect of each of the multiple candidate NFs).

During 7005, the NFc 701 selects an NFp from among the candidate NFps returned by the NRF during 7002. This selecting may be performed using the altered NRF priorities received during 7002 when altered NRF priorities are received during 7002. When no altered NRF priorities were received for a candidate NF during 7002, the NFc applies the priorities received in the candidate NF profile during 7004.

The signalling during 7002 may thus be considered as comprising a set of NF Instance IDs of candidate NFs without comprising respective NF profiles for those candidate NFs. In contrast, the signalling of 7004 may be considered as comprising an NF profile of a candidate NF requested/identified in the signalling of 7003. The NF service consumer uses information comprised in the NF profile, together with the NRF altered priorities received in 7002, to select one candidate NF (e.g., the NF profile can contain a variety of different information from which this selection can be based).

The NFc 701 may further perform the selecting of 7005 using additional factors. At least one of these additional factors may be comprised in the NF profile(s) received during 7004. For example, the selecting of 7005 may be performed using at least one of: a capacity of the candidate NFp (the capacity of the candidate NF may be comprised in the NF profile associated with that candidate NF, and/or obtained directly from the NFp following signalling (e.g., using HTTP) between the NFc and the NFp), a current and/or predicted load of the candidate NFp (the load of the candidate NF may be comprised in the NF profile associated with that candidate NF, and/or obtained directly from the NFp following signalling (e.g., using HTTP) between the NFc and the NFp), a scheme for selecting the NFp, and/or version information for selecting the NFp.

Subsequent to an NFp being selected during 7005, the NFc signals a service request to the selected NFp to request that the NFp provides a service to the NFc. The selected NFp may provide a service to the NFc subsequent to the NFp receiving the service request.

In contrast to the example of FIG. 7, in which an NRF only returns altered priority information during 7002, the NRF may instead be configured to return the priority information for all candidate NF instances, NF service instances, and/or NF type specific data, regardless of whether the at least one of those priorities of the candidate NF profiles have been altered.

In this approach, the requester NFc would get all the priorities at once (i.e., during 7002), prior to retrieving candidate NF profiles and performing 7003 to 7004. This variation comprises a larger amount of overhead during equivalent signalling of 7002 than the example of 7002 itself.

More generically, the above examples may be applied to any instance in which an NRF alters the value of any attribute in the NF profile (i.e. not only the priority information), with the altered information being provided in an enhanced NF Discovery Response during 7002. Further, the requester NF may be configured to apply the NRF altered information to NF profiles the requester NF subsequent retrieves from the NRF when selecting the NF service producer.

In such a case, Table 7 may instead be represented by Table 9, and Table 8 may be represented by Table 10.

TABLE 9

Definition of type NfInstanceInfo

| Attribute name | Data type | Cardinality | Description. |
|---|---|---|---|
| nrfDiscApiUri | Uri | 0 . . . 1 | This information element may be present when the NRF holding the NF profile is not the NRF that received the NFDiscover request. It may be present otherwise. When present, this information element may comprise the API URI of the Nnrf_NFDiscovery service of the NRF holding the NF profile. The API URI may be formatted as specified in 3GPP standards. |
| preferredSearch | PreferredSearch | 0 . . . 1 | This information element may be present to indicate whether the NF Profile matches the preferred query parameters when the discovery request comprises any of the query parameter defined in the PreferredSearch data type. This information element takes precedence over the preferredSearch IE in the SearchResult, if any. |
| nrfAlteredAttributes | NrfAlteredAttributes | 0 . . . 1 | This information element may be present when the NRF wishes to signal modified attributes for the NF instance profile. |

TABLE 10

Definition of type NrfAlte red Info

| Attribute name | Data type | Cardinality | Description |
|---|---|---|---|
| nfProfileAttributes | array(ChangeItems) | 1 . . . N | This information element may be present when the NRF overwrites attributes of a NF Instance on NFProfile level. Includes the attributes value as set by the NRF. The absence of this information element may mean that the attributes on NF level (if any) is not overwritten. array(ChangeItems) may comprise a list of patch operations to apply, where patch operations are supported by JSON patch. |
| nfServiceListAttributes | array(ChangeItems) | 1 . . . N | This information element may be present when the NRF overwrites the attributes of a NF Instance on NFService level The value of each entry may be the attributes set by the NRF for the Service Instance indicated by the key. The Key is the serviceInstanceId for which the attributes is overwritten by the NRF. The absence of this information element, or when a serviceInstanceId is not included in the map, means that for the relevant Service Instance(s) the attributes (if any) is not overwritten. array(ChangeItems) may comprise a list of patch operations to apply, where patch operations are supported by JSON patch. |

When the NFc supports the Service-Map feature as defined in 3GP TS 29.510 to avoid the problems related to service instance arrays (i.e. that the requester NF may not be able to apply the array of Change Items correctly if the requester NF and NRF happen to end up with a different representation of the array of service instances), the NFInstanceInfo attribute may be defined as per Table 11:

TABLE 11

Definition of type NFInstanceInfo

| Attribute name | Data type | Cardinality | Description |
| --- | --- | --- | --- |
| nrfDiscApiUri | Uri | 0 . . . 1 | This information element may be present when the NRF holding the NF profile is not the NRF that received the NFDiscover request. This information element may be present otherwise. When present, this information element may comprise an application programming interface (API) Uniform Resource Interface (URI) of the Nnrf_NFDiscovery service of the NRF holding the NF profile. The API URI shall be formatted as specified in clause 6.2.1 |
| preferredSearch | PreferredSearch | 0 . . . 1 | This information element may be present to indicate whether the NF Profile matches the preferred query parameters, if the discovery request contains any of the query parameter defined in the PreferredSearch data type. This information element may take precedence over any "preferredSearch" information element comprised in the SearchResult |
| nrfAlteredAttributes | Array(ChangeItem) | 1 . . . 1 | This information element may be present when the NRF wishes to signal modified attributes for the NF instance profile. |

Figure 8A:
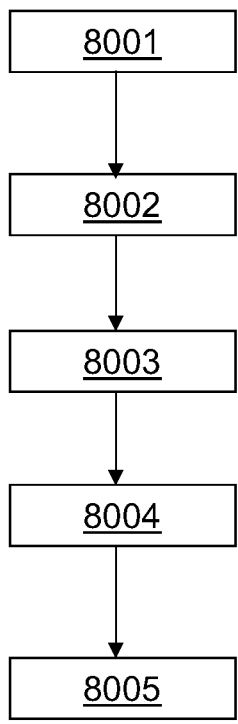
FIGS. 8A, 8B and 9 are flowcharts illustrating example operations that may be performed by apparatuses described herein.
Figure 8B:
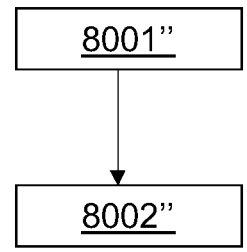
Figure 9:
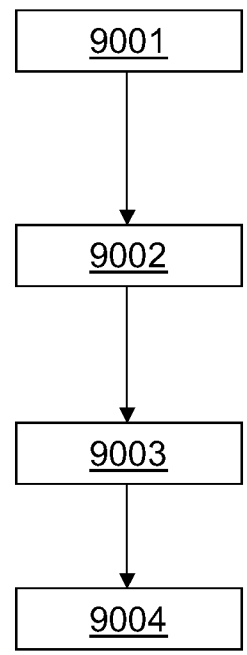

FIGS. 8 to 9 are flowcharts representing potential operations that may be performed by apparatus described herein. They illustrate general aspects of the examples provided above. It is understood that the examples provided above may be combined with the operations of the flowcharts of FIGS. 8 and 9 to provide further explanation, context, and/or features to the following general operations without loss of generality.

FIG. 8A illustrates operations that may be performed by an apparatus for a network repository function. The network repository function may be located in a home PLMN or in a visitor PLMN.

During 8001, the apparatus maintains respective network profiles for a plurality of network functions, the network profiles each comprising indications of services and/or attributes of the network function associated with that network profile.

During 8002, the apparatus receives, from a first network function, a first request for a discovery of at least one second network function having an associated network profile that fulfils a set of search criteria. The first network function may be a first network function as described below in relation to FIG. 9. The first network function may be a consumer NF (i.e., an NFc) looking to discover a producer NF (i.e. an NFp).

During 8003, the apparatus uses the set of search criteria and the respective network profiles to determine the at least one second network function.

During 8004, the apparatus alters, for at least one of the at least one second network function, a value of at least one attribute comprised in at least one of the network profiles associated with that second network function.

This altered value may be stored and/or cached locally. This altered value may not be stored in the at least one of the network profiles associated with that second network function. In other words, the altered value may be generated (and subsequently signalled during 8005) without altering the corresponding value for this at least one attribute that is maintained at the apparatus. This means that when the apparatus subsequently receives, from a requesting network function, a request for a network profile associated with a particular second network function, the apparatus will signal the associated network profile (comprising the unaltered value) to the requesting network function.

During 8005, the apparatus signals, to the first network function in response to the first request, identifiers for the at least one second network function, and said altered value(s) of the at least one attribute. This signalling of 8005 may omit network profiles for the at least one second network functions. In other words, the signalling of 8005 may comprise identifiers of at least one second network function but not network profiles associated with those identified at least one second network functions. The first network function may be configured to retrieve an NF profile for at least one of the at least one second functions from either the apparatus or from another NRF using a discovery request transmitted subsequent to 8005.

More generally, these steps of FIG. 8A may be represented by the following operations of FIG. 8B.

During 8001", the apparatus may alter, for a second network function, a value of an attribute in a network profile associated with said second network function.

As per the discussion with respect to 8004, this altered value may be stored and/or cached locally. This altered value may not be stored in the at least one of the network profiles associated with that second network function. In other words, the altered value may be generated (and subsequently signalled during 8002") without altering the corresponding value for this at least one attribute that is maintained at the apparatus. This means that when the apparatus subsequently receives, from a requesting network function, a request for a network profile associated with a particular second network function, the apparatus will signal the associated network profile (comprising the unaltered value) to the requesting network function.

During 8002", the apparatus may signal, to a first network function, an identifier for said second network function in addition to an said altered value of said attribute, based on a first request for discovery from said first network function. Said network profile may comprise an indication of a service and/or an attribute of said second network function. The first network function may be a first network function as described below in relation to FIG. 9. The first network function may be a consumer NF (i.e., an NFc) looking to discover a producer NF (i.e. an NFp).

This signalling of 8002" may omit network profiles for the at least one second network functions. In other words, the signalling of 8002" may comprise identifiers of at least one second network function but not network profiles associated with those identified at least one second network functions. The first network function may be configured to retrieve an NF profile for at least one of the at least one second functions from either the apparatus or from another NRF using a discovery request transmitted subsequent to 8002"

The following may be combined with the operations of FIGS. 8A and/or 8B.

The altering the value may comprise altering a priority value of selecting the at least one of the at least one second network function. The priority value may correspond to a value representing a priority of: a network function instance of the at least one second network function; and/or a network function service instance of the at least one second network function; and/or a network function-type specific information priority of the at least one second network function.

The altering the priority may comprise using the set of search criteria comprised in the received discovery request to rank the at least one second network function from those second network functions that most match the set of search criteria to those that least match the set of search criteria; and alter the priority for the at least one second network function to reflect the rank. In other words, the altered value may correspond to a value indicated as being a preference in the received discovery request from the first network function. The preference may be comprise at least one search query preference, as discussed in the above examples.

The signalling, to the first network function, identifiers for the at least one second network function and said altered values may comprise providing, in said signalling to the first network function in respect of each of the at least one second network function, values for said at least one attribute regardless of whether the values have been altered by the apparatus.

The apparatus may receive, from the first network function, a second request for discovering a network profile corresponding to at least one of the at least one second network function; and signal the corresponding network profile to the first network apparatus in response to the second request. As mentioned above, this corresponding network profile may comprise the unaltered value of the signalled altered attribute value.

FIG. 9 illustrates example operations that may be performed by an apparatus for a first network function. The first network function may be configured to interact with the apparatus of FIG. 8A and/or FIG. 8B. The first network function may correspond to the first network function described with respect to FIG. 8A and/or FIG. 8B.

During 9001, the apparatus signalling, to a network repository function, a first request for a discovery of at least one second network function having an associated network profile that fulfils a set of search criteria, a network profile comprising indications of services and/or attributes of the network function associated with that network profile. The network repository function may be the network repository function described above in respect of FIG. 8A and/or FIG. 8B.

During 9002, the apparatus receives, from the network repository function in response to the first request, identifiers for the at least one second network function and, for at least one of the at least one second network function, at least one altered value altered by the network repository function for at least one attribute in a network profile associated with the at least one of the at least one second network function. This may correspond to the signalling of 8005 and/or of 8002". In other words, this signalling may not comprise any network profile for the at least one second network functions identified in the response to the first request.

During 9003, the apparatus uses the at least one altered value to select at least one of the at least one second network functions for providing a service to the first network function. This selecting may further be performed, as mentioned below, by using information comprised in a network profile associated with the selected at least one of the at least one second network function. This associated network profile may be obtained following signalling with a network repository function, as described further below.

During 9004, the apparatus signals the selected at least one of the at least one second network function to request that a service be provided to the first network function. The apparatus may subsequently be provided a service from the selected at least one of the at least one second network function. In other words, the apparatus may be caused to receive the requested service from the selected at least one of the at least one second network function (assuming the selected second network function consents to provide the requested service).

The receiving, from the network repository function, identifiers for the at least one second network function and said at least one altered value may comprise: receiving, in said signalling in respect of each of the at least one second network function, values for said at least one attribute regardless of whether the values have been altered by the apparatus.

The apparatus may signal, to the first network apparatus, a second request for discovering a network profile corresponding to at least one of the at least one second network function; and receive, from the network repository function the corresponding network profile of the at least one of the at least one second network function in response to the second request.

The using the at least one altered value to select at least one of the at least one second network functions for providing a service to the first network function may comprise selecting the at least one of the at least one second network functions using both the at least one altered value and the received corresponding network profile.

The discovery request of 9001 may comprise at least one preference. This at least one preference may be represented by search criteria. The altered value may correspond to at least one of the search criteria/preferences comprised in the discovery request of 9001. The preference/search criteria may be as described above.

The at least one attribute may correspond to a priority for selecting that second network function. The priority may comprise a priority value that corresponds to a value representing a priority of: a network function instance of the at least one second network function; and/or a network function service instance of the at least one second network function; and/or a network function-type specific information priority of the at least one second network function.

In respect of the examples of FIGS. 8A, 8B and 9, the response to the first request may be signalled as part of an enhanced network function discovery procedure of the network repository function's network function discovery service.

In respect of the examples of FIGS. 8A, 8B and 9, the first network function may be: a user plane function, and/or an access and mobility management function, and/or a session management function, and/or a unified data management function, and/or a policy control function, and/or a network exposure function, and/or a network data and analytics function, and/or an application function, and/or a charging function.

In respect of the examples of FIGS. 8A, 8B and 9, the at least one second network function may be: a user plane function, and/or an access and mobility management function, and/or a session management function, and/or a unified data management function, and/or a policy control function, and/or a network exposure function, and/or a network data and analytics function, and/or an application function, and/or a charging function.

It is understood that references described herein to entities that "interface" with other entities may also be read as those entities allowing direct signalling to be performed in at least one direction between the interfacing entities. In other words, if entity A and entity B each interface with entity C while entity A and B do not interface with each other, then direct signalling in at least one direction may be performed between entity A and entity C and between entity B and entity C, and direct signalling may not be performed between entity A and entity B.

Figure 2:
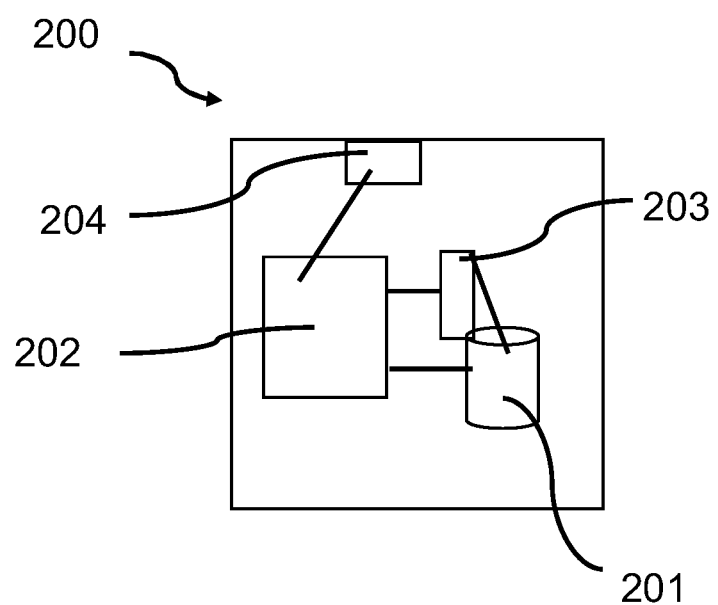
FIG. 2 shows a schematic representation of a network apparatus.

FIG. 2 shows an example of a control apparatus for a communication system, for example to be coupled to and/or for controlling a station of an access system, such as a RAN node, e.g. a base station, gNB, a central unit of a cloud architecture or a node of a core network such as an MME or S-GW, a scheduling entity such as a spectrum management entity, or a server or host, for example an apparatus hosting an NRF, NWDAF, AMF, SMF, UDM/UDR, and so forth. The control apparatus may be integrated with or external to a node or module of a core network or RAN. In some examples, base stations comprise a separate control apparatus unit or module. In other examples, the control apparatus can be another network element, such as a radio network controller or a spectrum controller. The control apparatus 200 can be arranged to provide control on communications in the service area of the system. The apparatus 200 comprises at least one memory 201, at least one data processing unit 202, 203 and an input/output interface 204. Via the interface the control apparatus can be coupled to a receiver and a transmitter of the apparatus. The receiver and/or the transmitter may be implemented as a radio front end or a remote radio head. For example, the control apparatus 200 or processor 201 can be configured to execute an appropriate software code to provide the control functions.

Figure 3:
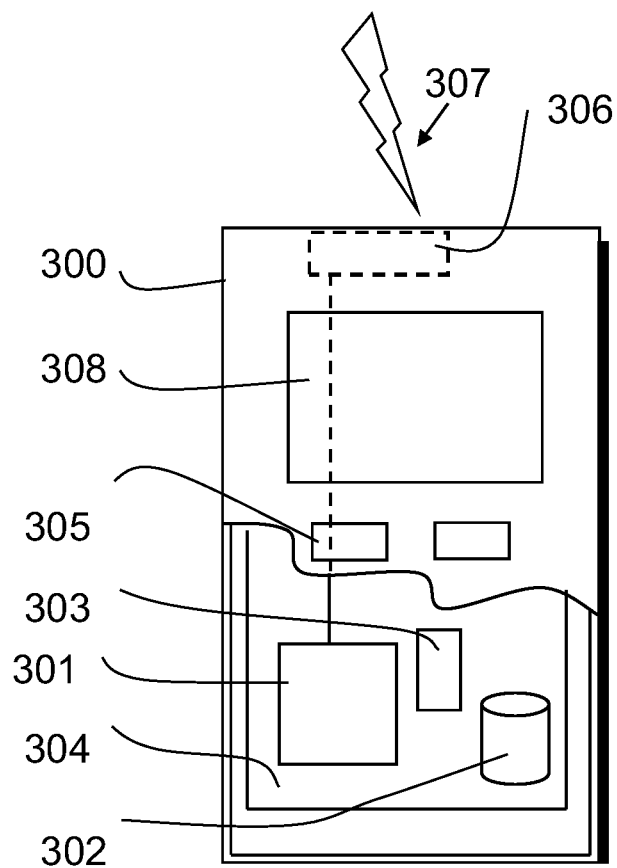
FIG. 3 shows a schematic representation of a user equipment.

A possible wireless communication device will now be described in more detail with reference to FIG. 3 showing a schematic, partially sectioned view of a communication device 300. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is referred to as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

A wireless communication device may be for example a mobile device, that is, a device not fixed to a particular location, or it may be a stationary device. The wireless device may need human interaction for communication, or may not need human interaction for communication. As described herein, the terms UE or "user" are used to refer to any type of wireless communication device.

The wireless device 300 may receive signals over an air or radio interface 307 via appropriate apparatus for receiving and may transmit signals via appropriate apparatus for transmitting radio signals. In FIG. 3, a transceiver apparatus is designated schematically by block 306. The transceiver apparatus 306 may be provided, for example, by means of a radio part and associated antenna arrangement. The antenna arrangement may be arranged internally or externally to the wireless device.

A wireless device is typically provided with at least one data processing entity 301, at least one memory 302 and other possible components 303 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 304. The user may control the operation of the wireless device by means of a suitable user interface such as keypad 305, voice commands, touch sensitive screen or pad, combinations thereof or the like. A display 308, a speaker and a microphone can be also provided. Furthermore, a wireless communication device may comprise appropriate connectors (either wired or wireless) to other devices and/or for connecting external accessories, for example hands-free equipment, thereto.

Figure 4:
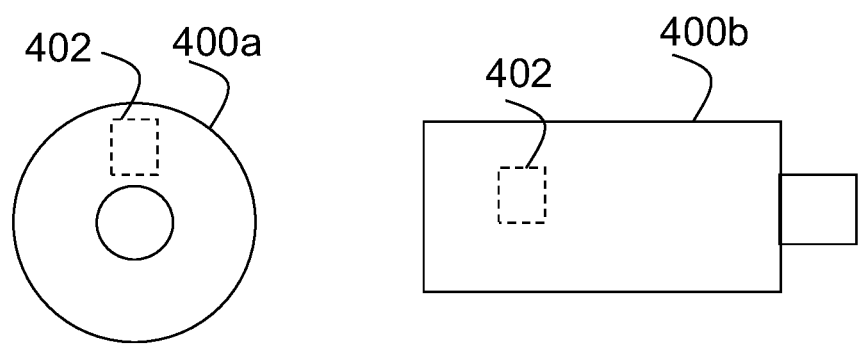
FIG. 4 shows a schematic representation of a non-volatile memory medium storing instructions which when executed by a processor allow a processor to perform one or more of the steps of the methods of some examples.

FIG. 4 shows a schematic representation of non-volatile memory media 400a (e.g. computer disc (CD) or digital versatile disc (DVD)) and 400b (e.g. universal serial bus (USB) memory stick) storing instructions and/or parameters 402 which when executed by a processor allow the processor to perform one or more of the steps of the methods of FIG. 9 and/or FIG. 8A and/or FIG. 8B and/or methods otherwise described previously.

As provided herein, various aspects are described in the detailed description of examples and in the claims. In general, some examples may be implemented in hardware or special purpose circuits, software, logic or any combination thereof. For example, some aspects may be implemented in hardware, while other aspects may be implemented in firmware or software which may be executed by a controller, microprocessor or other computing device, although examples are not limited thereto. While various examples may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The examples may be implemented by computer software stored in a memory and executable by at least one data processor of the involved entities or by hardware, or by a combination of software and hardware. Further in this regard it should be noted that any procedures, e.g., as in FIG. 8A and/or FIG. 8B and/or FIG. 9 and/or otherwise described previously, may represent program steps, or interconnected logic circuits, blocks and functions, or a combination of program steps and logic circuits, blocks and functions. The software may be stored on such physical media as memory chips, or memory blocks implemented within the processor, magnetic media (such as hard disk or floppy disks), and optical media (such as for example DVD and the data variants thereof, CD, and so forth).

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (AStudy ItemC), gate level circuits and processors based on multi-core processor architecture, as non-limiting examples.

Additionally or alternatively, some examples may be implemented using circuitry. The circuitry may be configured to perform one or more of the functions and/or method steps previously described. That circuitry may be provided in the base station and/or in the communications device and/or in a core network entity.

As used in this application, the term "circuitry" may refer to one or more or all of the following:
  (a) hardware-only circuit implementations (such as implementations in only analogue and/or digital circuitry);
  (b) combinations of hardware circuits and software, such as:
    (i) a combination of analogue and/or digital hardware circuit(s) with software/firmware and
    (ii) any portions of hardware processor(s) with software (including digital signal processor(s)), software, and memory(ies) that work together to cause an apparatus, such as the communications device or base station to perform the various functions previously described; and
  (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of non-limiting examples a full and informative description of some examples. However, various modifications and adaptations may become apparent to those skilled in the relevant arts in view of the foregoing description, when read in conjunction with the accompanying drawings and the claims. However, all such and similar modifications of the teachings will still fall within the scope of the claims.

In the above, different examples are described using, as an example of an access architecture to which the described techniques may be applied, a radio access architecture based on long term evolution advanced (LTE Advanced, LTE-A) or new radio (NR, 5G), without restricting the examples to such an architecture, however. The examples may also be applied to other kinds of communications networks having suitable means by adjusting parameters and procedures appropriately. Some examples of other options for suitable systems are the universal mobile telecommunications system (UMTS) radio access network (UTRAN), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 5:
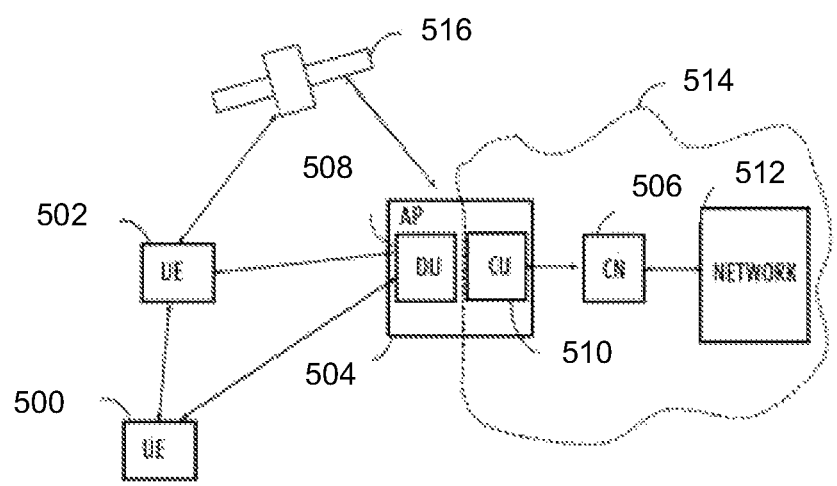
FIG. 5 shows a schematic representation of a network.

FIG. 5 depicts examples of simplified system architectures only showing some elements and functional entities, all being logical units, whose implementation may differ from what is shown. The connections shown in FIG. 5 are logical connections; the actual physical connections may be different. It is apparent to a person skilled in the art that the system typically comprises also other functions and structures than those shown in FIG. 5.

The examples are not, however, restricted to the system given as an example but a person skilled in the art may apply the solution to other communication systems provided with necessary properties.

The example of FIG. 5 shows a part of an exemplifying radio access network. For example, the radio access network may support sidelink communications described below in more detail.

FIG. 5 shows devices 500 and 502. The devices 500 and 502 are configured to be in a wireless connection on one or more communication channels with a node 504. The node 504 is further connected to a core network 506. In one example, the node 504 may be an access node such as (e/g)NodeB serving devices in a cell. In one example, the node 504 may be a non-3GPP access node. The physical link from a device to a (e/g)NodeB is called uplink or reverse link and the physical link from the (e/g)NodeB to the device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to devices. The antenna unit may comprise a plurality of antennas or antenna elements. The (e/g)NodeB is further connected to the core network 506 (CN or next generation core NGC). Depending on the deployed technology, the (e/g)NodeB is connected to a serving and packet data network gateway (S-GW+P-GW) or user plane function (UPF), for routing and forwarding user data packets and for providing connectivity of devices to one or more external packet data networks, and to a mobile management entity (MME) or access mobility management function (AMF), for controlling access and mobility of the devices.

Examples of a device are a subscriber unit, a user device, a user equipment (UE), a user terminal, a terminal device, a mobile station, a mobile device, etc The device typically refers to a mobile or static device (e.g. a portable or non-portable computing device) that includes wireless mobile communication devices operating with or without an universal subscriber identification module (USIM), including, but not limited to, the following types of devices: mobile phone, smartphone, personal digital assistant (PDA), handset, device using a wireless modem (alarm or measurement device, etc.), laptop and/or touch screen computer, tablet, game console, notebook, and multimedia device. It should be appreciated that a device may also be a nearly exclusive uplink only device, of which an example is a camera or video camera loading images or video clips to a network. A device may also be a device having capability to operate in Internet of Things (IoT) network which is a scenario in which objects are provided with the ability to transfer data over a network without requiring human-to-human or human-to-computer interaction, e.g. to be used in smart power grids and connected vehicles. The device may also utilise cloud. In some applications, a device may comprise a user portable device with radio parts (such as a watch, earphones or eyeglasses) and the computation is carried out in the cloud.

The device illustrates one type of an apparatus to which resources on the air interface are allocated and assigned, and thus any feature described herein with a device may be implemented with a corresponding apparatus, such as a relay node. An example of such a relay node is a layer 3 relay (self-backhauling relay) towards the base station. The device (or, in some examples, a layer 3 relay node) is configured to perform one or more of user equipment functionalities.

Various techniques described herein may also be applied to a cyber-physical system (CPS) (a system of collaborating computational elements controlling physical entities). CPS may enable the implementation and exploitation of massive amounts of interconnected information and communications technology, ICT, devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 5) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control). 5G is expected to have multiple radio interfaces, e.g. below 6 GHz or above 24 GHz, cmWave and mmWave, and also being integrable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz—cmWave, 6 or above 24 GHz—cmWave and mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The LTE network architecture is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks 512, such as a public switched telephone network, or a VoIP network, or the Internet, or a private network, or utilize services provided by them. The communication network may also be able to support the usage of cloud services, for example at least part of core network operations may be carried out as a cloud service (this is depicted in FIG. 5 by "cloud" 514). This may also be referred to as Edge computing when performed away from the core network. The communication system may also comprise a central control entity, or a like, providing facilities for networks of different operators to cooperate for example in spectrum sharing.

The technology of Edge computing may be brought into a radio access network (RAN) by utilizing network function virtualization (NFV) and software defined networking (SDN). Using the technology of edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloud-RAN architecture enables RAN real time functions being carried out at or close to a remote antenna site (in a distributed unit, DU 508) and non-real time functions being carried out in a centralized manner (in a centralized unit, CU 510).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where Edge computing servers can be placed between the core and the base station or nodeB (gNB). One example of Edge computing is MEC, which is defined by the European Telecommunications Standards Institute. It should be appreciated that MEC (and other Edge computing protocols) can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, Mobile Broadband, (MBB) or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite in the mega-constellation may cover several satellite-enabled network entities that create on-ground cells. The on-ground cells may be created through an on-ground relay node or by a gNB located on-ground or in a satellite.

The depicted system is only an example of a part of a radio access system and in practice, the system may comprise a plurality of (e/g)NodeBs, the device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 5 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 5). A HNB Gateway (HNB-GW), which is typically installed within an operator's network may aggregate traffic from a large number of HNBs back to a core network.

The changes described above may be represented in a 3GPP standard (e.g. TS 29.510) via text corresponding to the text attached below.

Overview of Change Request

During an NF Discovery procedure, the NRF may alter the priority IEs in candidate NF profiles it returns in the NF Discovery response, e.g. based on the preference query parameters and operator policies.

The Enhanced NF Discovery feature specified in Rel-17 does not allow the NRF to return altered priority values for candidate NF instances returned in the nfInstanceList IE within the NF Discovery response:

the NF Discovery response does not support means to signal NRF altered priority values for NF instances listed in the nfInstanceList IE.

a subsequent NF Discovery request to retrieve the NF profile of an NF instance indicated in the nfInstanceList IE contains the target-nf-instance-id parameter identifying the target NF Instance ID, and does not contain the query parameters (e.g. preference parameters) of the original NF Discovery Request. Accordingly, the NRF cannot determine and alter the priority information in the NF profile returned in the NF Discovery response.

The Enhanced NF Discovery feature is enhanced to enable the NRF to signal NRF altered priorities for candidate NF instances returned in the nfInstanceList IE within the NF Discovery response.

The NRF cannot alter the priority information of candidate NF instances returned in the nfInstanceList IE within the NF Discovery response, when using the Enhanced NF Discovery procedure.

6.2.6.2.7 Type: NfInstanceInfo

TABLE 6.2.6.2.7-1

| Definition of type NfInstanceInfo | | | | | |
| --- | --- | --- | --- | --- | --- |
| Attribute name | Data type | P | Cardinality | Description | |
| nrfDiscApiUri | Uri | C | 0 . . . 1 | This IE shall be present when the NRF holding the NF profile is not the NRF that received the NFDiscover request. It may be present otherwise. When present, this IE shall contain the API URI of the Nnrf_NFDiscovery | |

TABLE 6.2.6.2.7-1-continued

Definition of type NfInstanceInfo

| Attribute name | Data type | P | Cardinality | Description |
|---|---|---|---|---|
| preferredSearch | PreferredSearch | O | 0...1 | service of the NRF holding the NF profile. The API URI shall be formatted as specified in clause 6.2.1<br>This IE may be present to indicate whether the NF Profile matches the preferred query parameters, when the discovery request contains any of the query parameter defined in the PreferredSearch data type.<br>This IE takes precedence over the preferredSearch IE in the Search Result, if any. |
| nrfAlteredPriorities | NrfAltered Priorities | O | 0...1 | This IE may be present when the NRF wishes to signal modified priorities for the NF instance.<br>(NOTE) |

NOTE:
If this IE is present, the requester NF should apply the NRF altered priorities when selecting a NF service producer for the corresponding NF Discovery request, instead of the priorities retrieved in the corresponding NF profile.

6.2.6.2.x Type: NrfAlteredPriorities

TABLE 6.2.6.2.x-1

Definition of type NrfAlteredPriorities

| Attribute name | Data type | P | Cardinality | Description |
|---|---|---|---|---|
| nfProfilePriority | integer | C | 0...1 | This IE shall be present if the NRF alters the priority IE in NFProfile. When present, this IE shall be set to the priority value determined by the NRF.<br>The absence of this IE means that the priority IE in NFProfile is not altered. |
| nfServiceListPriority | map(integer) | C | 1...N | This IE shall be present if the NRF alters the priority IE in NFService for at least one NF service instance. When present, the value of each entry shall be set to the priority value determined by the NRF for the NF service instance indicated by the key.<br>The key of the map shall be the serviceInstanceId of the NF service instance for which the priority is altered.<br>The absence of this IE or the absence of a serviceInstanceId in the map means that the priority IE in NFService for the respective NF service instance is not altered. |
| smfInfoPriority | integer | C | 0...1 | This IE shall be present if the NRF alters the priority IE within the smfInfo IE of NFProfile. When present, this IE shall be set to the priority value determined by the NRF.<br>The absence of this IE means that the priority IE within the smfInfo IE of NFProfile is not altered. |
| smfInfoListPriority | map(integer) | C | 1...N | This IE shall be present if the NRF alters the priority IE within the smfInfoList IE of NFProfile. When present, the value of each entry shall be set to the priority value determined by the NRF for the smfInfo indicated by the key.<br>The key of the map shall be the key used to identify the smfInfo within the smfInfoList IE of NFProfile.<br>The absence of this IE or the absence of an smfInfo key means that the priority IE for the respective smfInfo is not altered. |
| upfInfoPriority | integer | C | 0...1 | This IE shall be present if the NRF alters the priority IE within the upfInfo IE of NFProfile. When present, this IE shall be set to the priority value determined by the NRF. |

TABLE 6.2.6.2.x-1-continued

Definition of type NrfAlteredPriorities

| Attribute name | Data type | P | Cardinality | Description |
| --- | --- | --- | --- | --- |
| upfInfoListPriority | map(integer) | C | 1 ... N | The absence of this IE means that the priority IE within the upfInfo IE of NFProfile is not altered. This IE shall be present if the NRF alters the priority IE within the upfInfoList IE of NFProfile. When present, the value of each entry shall be set to the priority value determined by the NRF for the upfInfo indicated by the key. The key of the map shall be the key used to identify the upfInfo within the upfInfoList IE of NFProfile. The absence of this IE or the absence of an upfInfo key means that the priority IE for the respective upfInfo is not altered. |

The invention claimed is:

1. An apparatus comprising:
   at least one processor; and
   at least one memory storing instructions that, when executed by the at least one processor, cause the apparatus to:
   maintain a network profile for each network function of a plurality of network functions including at least a first network function and a second network function, the plurality of network profiles comprising a network profile for the second network function comprising an indication of a service of the second network function and an attribute of the second network function;
   receive, from the first network function, a first request for discovery of at least one network function having an associated network profile that fulfils a set of search criteria;
   determine at least one candidate network function including the second network function, based on the set of search criteria and the plurality of network profiles;
   alter a value of the attribute of the network profile for the second network function; and
   send, in a discovery response to the first network function, at least one candidate network function identifier comprising an identifier for the second network function, in addition to said altered value of the attribute of the network profile for the second network function, based on the first request,
   wherein
   the identifier for the second network function comprises a uniform resource identifier to acquire the network profile for the second network function from the apparatus,
   the value of the attribute of the network profile for the second network function corresponds to a priority value,
   the altered value corresponds to an altered priority value, and
   the priority value corresponds to a value representing a priority of a network function instance of the second network function.

2. The apparatus of claim 1,
   wherein the priority value further corresponds to a value representing a priority of at least one of:
   a network function service instance of the second network function; or
   a network function-type specific information priority of the second network function.

3. The apparatus of claim 1, wherein the at least one memory comprises instructions, that when executed by the at least one processor, cause the apparatus at least to:
   rank, based on the set of search criteria, the at least one candidate network function from candidate network functions that most match the set of search criteria to candidate network functions that least match the set of search criteria,
   wherein
   the at least one candidate network function comprises a plurality of candidate network functions,
   the altered priority for the second network function reflects a rank of the second network function within the plurality of candidate network functions.

4. The apparatus of claim 1, wherein the at least one memory comprises instructions, that when executed by the at least one processor, cause the apparatus at least to:
   send, in said discovery response to the first network function, a value of an attribute of a network profile for a third network function regardless of whether the value of the attribute of the network profile for the third network function has been altered by the apparatus,
   wherein
   the plurality of network profiles further comprise the network profile for the third network function,
   the at least one candidate network function further comprises the third network function and
   the at least one candidate network function identifier further comprises a uniform resource identifier to acquire the network profile of for the third network function from the apparatus.

5. The apparatus of claim 1, wherein the at least one memory comprises instructions, that when executed by the at least one processor, cause the apparatus at least to:
   receive, from the first network function, a request for discovering the network profile of the second network function; and
   send, in a further discovery response to the first network function, the network profile for the second network function based on the request for discovering a network profile.

6. The apparatus of claim 1,
   wherein the first network function is implemented as at least one of:

a user plane function,
an access and mobility management function,
a session management function,
a unified data management function,
a policy control function,
a network exposure function,
a network data and analytics function,
an application function, or
a charging function.

7. The apparatus of claim 1,
wherein the second network function is implemented as at least one of:
a user plane function,
an access and mobility management function,
a session management function,
a unified data management function,
a policy control function,
a network exposure function,
a network data and analytics function,
an application function, or
a charging function.

8. An apparatus of a first network function, the apparatus comprising:
at least one processor; and
at least one memory storing instructions that, when executed by the at least one processor, cause the apparatus to:
send, to a network repository function, a first request for discovery of at least one network function having an associated network profile that fulfils a set of search criteria;
receive, in a discovery response from the network repository function, at least one candidate network function identifier comprising an identifier for a second network function, in addition to a value, altered by the network repository function, of an attribute of a network profile for the second network function;
select the second network function for providing a service to the first network function, based on the altered value of the attribute of the network profile for the second network function; and
send, to the second network function, a request that said service be provided,
wherein
the identifier for the second network function comprises a uniform resource identifier to acquire the network profile for the second network function from the network repository function,
the value of the attribute of the network profile for the second network function corresponds to a priority value,
the altered value corresponds to an altered priority value, and
the priority value corresponds to a value representing a priority of a network function instance of the second network function.

9. The apparatus of claim 8, wherein the priority value further corresponds to a value representing a priority of at least one of:
a network function service instance of the second network function; or
a network function-type specific information priority of the second network function.

10. The apparatus of claim 8, wherein the instructions, when executed by the at least one processor, further cause the apparatus at least to:

receive, in said discovery response from the network repository function, a value of an attribute of a network profile for a third network function regardless of whether the value of the attribute of the network profile for the third network function has been altered by the network repository function.

11. The apparatus of claim 8, wherein the instructions, when executed by the at least one processor, further cause the apparatus at least to:
send, to the network repository function, a request for discovering a network profile for the second network function; and
receive, from the network repository function, the network profile for the second network function, based on the request for discovering a network profile.

12. The apparatus of claim 11, wherein the instructions, when executed by the at least one processor, further cause the apparatus at least to:
select the second network function further based on the network profile for the second network function received from the network repository function.

13. The apparatus of claim 8, wherein the instructions, when executed by the at least one processor, further cause the apparatus at least to:
receive the requested service from the second network function.

14. A method, comprising:
maintaining a network profile for each network function of a plurality of network functions including at least a first network function and a second network function, the plurality of network profiles comprising a network profile for the second network function comprising an indication of a service of the second network function and an attribute of the second network function;
receiving, from the first network function, a first request for discovery of a network function having an associated network profile that fulfils a set of search criteria;
determining at least one candidate network function including the second network function, based on the set of search criteria and the plurality of network profiles;
altering a value of the attribute of the network profile for the second network function; and
sending, in a discovery response to the first network function, at least one candidate network function identifier comprising an identifier for the second network function, in addition to said altered value of the attribute of the network profile for the second network function, based on the first request,
wherein
the identifier for the second network function comprises a uniform resource identifier to acquire the network profile for the second network function,
the value of the attribute of the network profile for the second network function corresponds to a priority value,
the altered value corresponds to an altered priority value, and
the priority value corresponds to a value representing a priority of a network function instance of the second network function.

15. The method of claim 14, wherein the priority value further corresponds to a value representing a priority of at least one of:
a network function service instance of the second network function; or
a network function-type specific information priority of the second network function.

16. The method of claim 14, further comprising:
ranking, based on the set of search criteria, the at least one candidate network function from candidate network functions that most match the set of search criteria to candidate network functions that least match the set of search criteria,
wherein
the at least one candidate network function comprises a plurality of candidate network functions,
the altered priority for the second network function reflects a rank of the second network function within the plurality of candidate network functions.

17. The method of claim 14, wherein the first network function is implemented as at least one of:
a user plane function,
an access and mobility management function,
a session management function,
a unified data management function,
a policy control function,
a network exposure function,
a network data and analytics function,
an application function, or
a charging function.

18. The apparatus of claim 14, wherein the second network function is implemented as at least one of:
a user plane function,
an access and mobility management function,
a session management function,
a unified data management function,
a policy control function,
a network exposure function,
a network data and analytics function,
an application function, or
a charging function.

* * * * *